(12) United States Patent
Higuchi et al.

(10) Patent No.: US 9,258,305 B2
(45) Date of Patent: Feb. 9, 2016

(54) AUTHENTICATION METHOD, TRANSFER APPARATUS, AND AUTHENTICATION SERVER

(71) Applicant: ALAXALA Networks Corporation, Kanagawa (JP)

(72) Inventors: Hidemitsu Higuchi, Kawasaki (JP); Hirotaka Sunami, Kawasaki (JP); Motohide Nomi, Kawasaki (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 9 days.

(21) Appl. No.: 14/038,052

(22) Filed: Sep. 26, 2013

(65) Prior Publication Data
US 2014/0237544 A1 Aug. 21, 2014

(30) Foreign Application Priority Data

Feb. 20, 2013 (JP) ................... 2013-030649

(51) Int. Cl.
*H04L 29/06* (2006.01)
*H04L 29/08* (2006.01)

(52) U.S. Cl.
CPC ........ *H04L 63/0884* (2013.01); *H04L 63/0272* (2013.01); *H04L 63/0807* (2013.01); *H04L 63/168* (2013.01); *H04L 67/02* (2013.01)

(58) Field of Classification Search
CPC ............................ H04L 63/0884; H04L 67/02
USPC ........................................................... 726/3
See application file for complete search history.

(56) References Cited

U.S. PATENT DOCUMENTS

| 7,616,615 | B2* | 11/2009 | Sueyoshi et al. ..... H04L 12/2856 370/328 |
| 8,327,140 | B2* | 12/2012 | Mizukoshi .................... 713/168 |
| 2005/0113070 | A1* | 5/2005 | Okabe .......................... 455/411 |
| 2006/0015714 | A1 | 1/2006 | Hirano et al. |
| 2006/0059344 | A1* | 3/2006 | Mononen ..................... 713/171 |

(Continued)

FOREIGN PATENT DOCUMENTS

| EP | 2 194 482 A1 | 6/2010 |
| JP | 2006-033206 A1 | 2/2006 |

(Continued)

OTHER PUBLICATIONS

European Search Report received in European Application No. 13186224 dated Jun. 5, 2014.

*Primary Examiner* — Mahfuzur Rahman
(74) *Attorney, Agent, or Firm* — Mattingly & Malur, PC

(57) ABSTRACT

It is provided an authentication method for realizing a network authentication function for an authentication system, the authentication system including an authentication server for authenticating a terminal used by a user, and a switch for mediating an authentication sequence between the terminal and the authentication server. The authentication method includes steps of: providing, by the switch, identification information for identifying the switch to the authentication server in the authentication sequence; authenticating, by the authentication server, an authentication request transmitted from the terminal; transmitting, by the authentication server, an authentication result of the authentication to the switch based on the provided identification information on the switch; and authenticating, by the switch, access from the terminal based on the authentication result received from the authentication server.

10 Claims, 16 Drawing Sheets

(56) References Cited

U.S. PATENT DOCUMENTS

| | | | |
|---|---|---|---|
| 2006/0062228 A1* | 3/2006 | Ota et al. | 370/401 |
| 2006/0242038 A1* | 10/2006 | Giudilli | 705/35 |
| 2010/0088416 A1* | 4/2010 | Kurita | 709/227 |
| 2011/0119735 A1* | 5/2011 | Higuchi et al. | 726/3 |
| 2011/0145902 A1 | 6/2011 | Kim et al. | |
| 2011/0188508 A1 | 8/2011 | Hjelm et al. | |
| 2012/0084840 A1* | 4/2012 | Higuchi et al. | 726/4 |
| 2013/0205380 A1* | 8/2013 | Avni et al. | 726/7 |
| 2013/0219474 A1* | 8/2013 | Kuhnen et al. | 726/4 |
| 2014/0123266 A1* | 5/2014 | Carbou et al. | 726/13 |

FOREIGN PATENT DOCUMENTS

| | | |
|---|---|---|
| JP | 2010-062667 A1 | 3/2010 |
| WO | 2010/041347 A1 | 4/2010 |

* cited by examiner

| USER INFORMATION | | | AUTHENTICATION TERMINAL INFORMATION | | | AUTHENTICATION SWITCH INFORMATION | |
|---|---|---|---|---|---|---|---|
| USER ID | PASSWORD | VLAN | IP ADDRESS | MAC ADDRESS | ACCESS POLICY | IP ADDRESS | COUPLING PORT |
| USER A | PASSWORD A | VLAN10 | IP ADDRESS A | MAC-A | Dst-A: DISCARD | IP ADDRESS X | 0/1PORT |
| USER B | PASSWORD B | VLAN20 | IP ADDRESS B | MAC-B | Dst-B: DISCARD<br>Dst-C: DISCARD | IP ADDRESS X | 0/2PORT |
| ... | ... | ... | ... | ... | ... | ... | ... |

*Fig. 3* they are a Further, in the conventional authentication mode. in order to enable compatibility with the authentication server of a new authentication mode.

AUTHENTICATION METHOD, TRANSFER APPARATUS, AND AUTHENTICATION SERVER

CLAIM OF PRIORITY

The present application claims priority from Japanese patent application JP 2013-30649 filed on Feb. 20, 2013, the content of which is hereby incorporated by reference into this application.

BACKGROUND OF THE INVENTION

This invention relates to a network authentication system.

As communication networks become more important as an infrastructure, more various functions for enhancing security are proposed. One of the functions is network authentication. A network authentication system mainly includes an authentication switch coupled to a terminal and an authentication server for authenticating the terminal. In the conventional network authentication system, the terminal transmits an authentication request packet to the authentication switch. The authentication switch uses authentication information included in the received authentication request packet to inquire of the authentication server whether or not the received authentication information is registered therein. When notified by the authentication server that the authentication information has been already registered therein, the authentication switch allows communications of a source MAC address of the authentication request packet.

As background arts in this technical field, there are JP 2006-33206 A and JP 2010-62667 A.

JP 2006-33206 A discloses the following authentication system. Specifically, in the authentication system, a DHCP server dispenses an IP address in response to a request received from a terminal apparatus. The authentication server receives an authentication frame transmitted from the terminal apparatus, and performs authentication of the terminal apparatus. After completing the authentication, the authentication server notifies a registration information database within an authentication hub of communication permission for the terminal apparatus. In the authentication hub, a frame receiving circuit part receives a frame transmitted by the terminal apparatus. The authentication hub refers to the registration information database based on transmission source information of the frame, to thereby determine transmission of the frame, rewriting-and-transmission thereof, and discarding thereof, and transmits the transmission frame whose transmission or rewriting-and-transmission is permitted to a transmission buffer.

Further, JP 2010-62667 A discloses a network system in which a switching hub having an authentication function for authenticating a user terminal includes authentication means for transferring a packet for requesting authentication received from the user terminal to the authentication server, and transfers a packet of authentication response received from the authentication server to the user terminal, while determining that the above-mentioned user terminal has been authenticated when information on successful authentication is read out with reference to the packet of the authentication response.

SUMMARY OF THE INVENTION

In a Web authentication mode of the conventional authentication switch, a Web server is operated by the authentication switch, and when the authentication switch relays the authentication information input by a user to the authentication server, processing load imposed on the authentication switch increases. This reduces an upper limit of the number of authenticated terminals that can be controlled by the switch.

Further, in the conventional authentication switch, which needs to support a plurality of network authentication modes, it is necessary to add a module for each authentication mode in order to enable compatibility with the authentication server of a new authentication mode.

Further, when the terminal and the authentication server directly perform an authentication sequence, the authentication server does not have information on a switch to which an authentication terminal is coupled. Therefore, when there are a plurality of authentication switches, it is difficult for the authentication server to know the authentication switch to which the authentication terminal is coupled.

As in the above-mentioned conventional technology, when the terminal and the authentication server directly perform the authentication sequence, it suffices that the authentication switch uses an authentication result to set a filter for the IP address and the MAC address and QoS for the terminal, which alleviates load imposed on the authentication switch. However, with this method, it is not possible to manage whether or not the authenticated terminal has left a network. Therefore, the authentication information, filter information, and a QoS setting that are unnecessary remain within the authentication switch, thereby consuming a storage capacity of the authentication switch wastefully. Further, there is a fear that the terminal spoofing the authenticated MAC address may be coupled, which deteriorates security.

The representative one of inventions disclosed in this application is outlined as follows. There is provided an authentication method for realizing a network authentication function for an authentication system, the authentication system including an authentication server for authenticating a terminal used by a user, and a switch for mediating an authentication sequence between the terminal and the authentication server. The authentication method including steps of: providing, by the switch, identification information for identifying the switch to the authentication server in the authentication sequence; authenticating, by the authentication server, an authentication request transmitted from the terminal; transmitting, by the authentication server, an authentication result of the authentication to the switch based on the provided identification information on the switch; and authenticating, by the switch, access from the terminal based on the authentication result received from the authentication server.

According to the exemplary embodiment of this invention, it is possible to register the authentication result in the authentication switch. The other problems, configurations, and effects than those described above become apparent from the following descriptions of embodiments.

BRIEF DESCRIPTION OF THE DRAWINGS

The present invention can be appreciated by the description which follows in conjunction with the following figures, wherein:

FIG. 3 is an explanatory diagram illustrating a configuration of the authenticated terminal registration table according to the first embodiment;

DETAILED DESCRIPTION OF THE PREFERRED EMBODIMENTS

First Embodiment

In a first embodiment of this invention, an authentication switch 400 having an authentication function notifies an authentication server 100 of information on the authentication switch 400 and information on a terminal 600 via the terminal 600, and the authentication server 100 registers an authentication result in the authentication switch 400.

Figure 1:
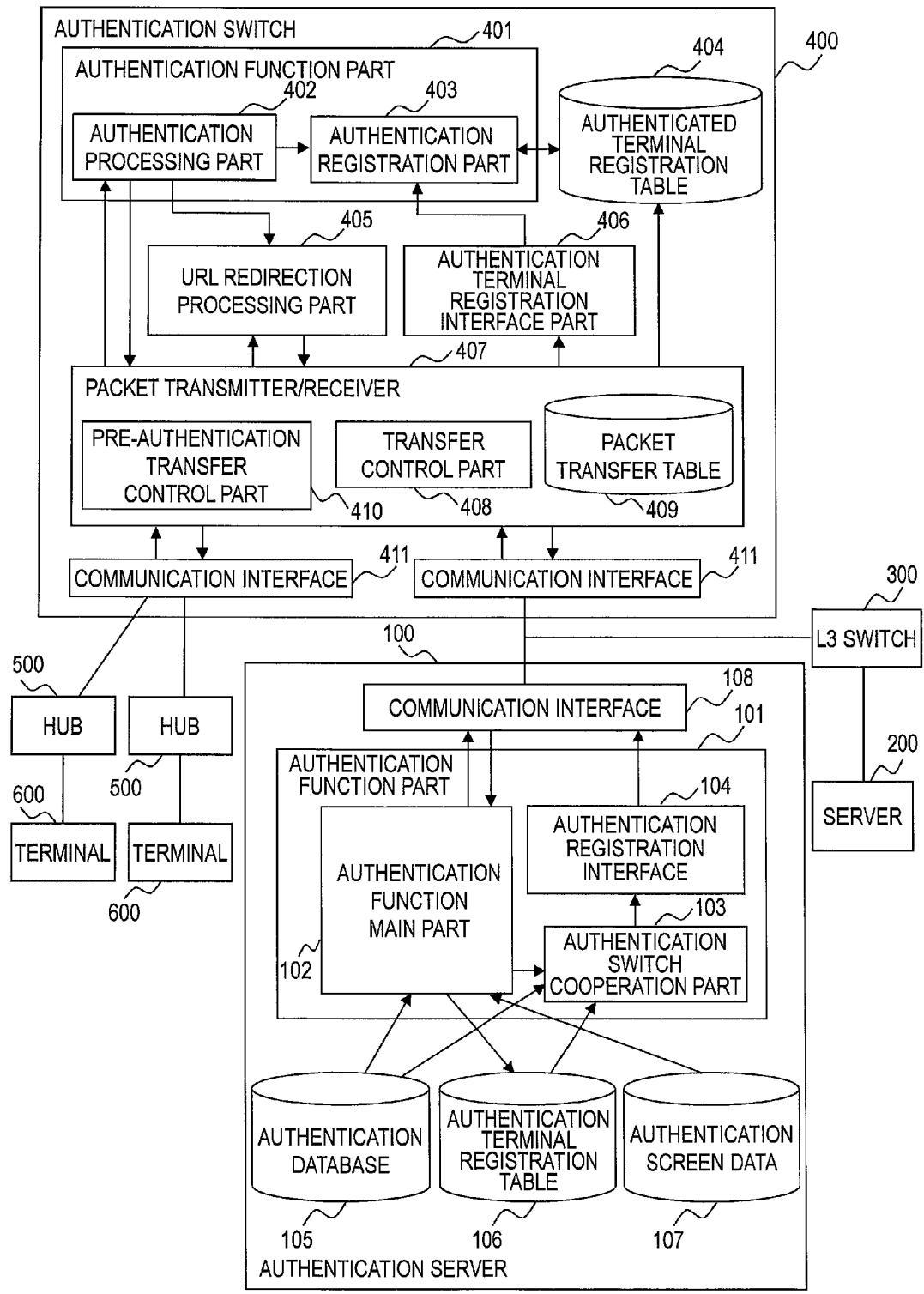
FIG. 1 is a block diagram illustrating a configuration of an authentication system according to a first embodiment.

FIG. 1 is a block diagram illustrating a configuration of an authentication system according to the first embodiment.

The authentication system according to the first embodiment includes the authentication server 100, a server 200, an L3 switch 300, at least one authentication switch 400, and at least one HUB 500. The HUB 500 serves to couple at least one terminal 600 thereto.

The authentication server 100, the server 200, and the authentication switch 400 are coupled to the L3 switch 300. Further, the HUB 500 is coupled to the authentication switch 400, and the terminal 600 is coupled to the HUB 500.

The authentication server 100 is a computer including a processor and a memory, and provides a function of authenticating a user of the terminal 600 (for example, RADIUS authentication or Shibboleth authentication) and setting the authentication result in the authentication switch 400.

The authentication server 100 is the computer including the processor for executing a program, the memory for storing the program executed by the processor, a storage apparatus for storing data used when the program is executed, and a communication interface 108 coupled to a network. In other words, the program executed by the processor is read out from the storage apparatus and loaded into the memory to be executed by the processor. The processor executes a predetermined program, to thereby implement the function of each component.

The authentication server 100 includes an authentication function part 101, an authentication database 105, an authentication terminal registration table 106, an authentication screen data 107, and the communication interface 108.

The authentication function part 101 authenticates the terminal 600 that has requested the authentication server 100 for authentication thereof. The authentication function part 101 includes an authentication function main part 102, an authentication switch cooperation part 103, and an authentication registration interface 104.

The authentication function main part 102 refers to the authentication database 105 to authenticate an authentication request transmitted from the terminal 600. Further, the authentication function main part 102 acquires the information on the terminal 600 that has requested the authentication and the information on the authentication switch 400 to which the terminal 600 is coupled from the received authentication request, and registers the acquired information in the authentication terminal registration table 106. Further, the authentication function main part 102 notifies the terminal 600 that has requested the authentication and the authentication switch cooperation part 103 of a result of user authentication.

When notified of the authentication result by the authentication function main part 102, the authentication switch cooperation part 103 uses a user ID transmitted from the authenticated terminal 600 to search the authentication terminal registration table 106, and uses the retrieved information to register the authenticated user and terminal 600 in the authentication switch 400 via the authentication registration interface 104 and the communication interface 108.

The authentication registration interface 104 transmits the information on the authenticated user and terminal 600 to the authentication switch 400 in response to the request received from the authentication switch cooperation part 103.

The authentication database 105, which is stored in the storage apparatus, is a database in which information for authenticating the terminal 600 is registered. For example, in a case where the authentication uses a password, the authentication database 105 includes the user ID and the password. Further, the authentication database 105 may include an access policy (for example, information on a VLAN, QoS, a filter) used when the authentication is successful.

The authentication terminal registration table 106, which is stored in the storage apparatus, is a table in which the information on the authenticated user, the information on the authenticated terminal 600, and the information on an authentication switch coupled to the authenticated terminal 600 are registered. The authentication terminal registration table 106 includes, for example, the user ID, the password, the information (IP address and MAC address) on the terminal 600, the information (IP address) on the authentication switch 400 to which the terminal 600 is coupled, and the authentication result.

The authentication screen data 107, which is stored in the storage apparatus, is screen data to be displayed on the terminal 600 in order to allow the information used for the user authentication to be input.

The communication interface 108 is a network interface having a function of transmitting/receiving packets in conformity to, for example, Ethernet standards (Ethernet is a trademark; the same applies hereinafter).

The program executed by the processor is provided to the authentication server 100 via a removable medium (such as CD-ROM or flash memory) or the network, and is stored in the storage apparatus being a non-transitory storage medium. Therefore, it is preferred that the authentication server 100 include an interface (for example, optical disc drive or USB port) for reading the removable medium.

The server 200 is a computer including a processor for executing a program, a memory for storing the program executed by the processor, and a network interface. For example, the server 200 receives access from the terminal 600, and provides a Web server function and an FTP function to the terminal 600.

The L3 switch 300 is a packet transfer apparatus for transferring a packet among the authentication server 100, the server 200, and the authentication switch 400 that are coupled thereto.

The authentication switch 400 is a packet transfer apparatus for transferring a packet between the L3 switch 300 and the HUB 500 that are coupled thereto. Further, the authentication switch 400 uses an authenticated terminal registration table 404 to manage the terminal 600 authenticated by the authentication server 100.

The authentication switch 400 includes an authentication function part 401, the authenticated terminal registration table 404, a URL redirection processing part 405, an authentication terminal registration interface part 406, a packet transmitter/receiver 407, and a communication interface 411.

The authentication function part 401 processes the authentication request transmitted from the terminal 600. The authentication function part 401 includes an authentication processing part 402 and an authentication registration part 403. The authentication processing part 402 provides a network authentication function for processing the authentication request transmitted from the terminal 600. The authentication registration part 403 registers the information on an authenticated terminal authenticated by the authentication server 100 in the authenticated terminal registration table 404.

The authenticated terminal registration table 404 manages the information on the authenticated terminal including the MAC address, the IP address, the user ID, a belonging VLAN ID, and access control information. A structure of the authenticated terminal registration table 404 is described later with reference to FIG. 3.

When receiving an HTTP access from the terminal 600, the URL redirection processing part 405 outputs a redirection notification including a command to redirect the terminal 600 directly to the server 200. The output redirection notification includes the IP address of the authentication switch 400, the IP address of the terminal 600 to be authenticated, the MAC address of the terminal 600 to be authenticated, identification information on a VLAN to which the terminal 600 to be authenticated is to belong, and information on a physical port of the authentication switch 400 to which the terminal 600 to be authenticated is coupled. Those pieces of information are sent from the terminal 600 to the authentication server 100.

The authentication terminal registration interface part 406 is an interface for registering the information on the authenticated terminal 600 through an input from an external part. Even if the authentication switch 400 does not support an authentication protocol, the authentication terminal registration interface part 406 registers the authentication result for the terminal 600 obtained by the authentication server 100 in the authentication switch 400, and allows the authentication switch 400 to perform network authentication.

The packet transmitter/receiver 407 provides a packet transmission/reception function for receiving a packet and transmitting the received packet. The packet transmitter/receiver 407 includes a transfer control part 408, a packet transfer table 409, and a pre-authentication transfer control part 410.

The transfer control part 408 includes a transfer engine for determining a port through which the received packet is output with reference to the packet transfer table 409. The packet transfer table 409 retains information used for transferring the packet, which includes a relationship between a destination of the packet and the port and information (for example, IP address and MAC address of the terminal 600) for referring to the authenticated terminal registration table 404. The pre-authentication transfer control part 410 causes the coupled terminal 600 before authentication to belong to the VLAN before authentication.

Specifically, the pre-authentication transfer control part 410 uses a transmission source MAC address of the received packet to search the packet transfer table 409. When the transmission source MAC address is an address given to the authenticated terminal, the pre-authentication transfer control part 410 transfers the packet in accordance with a transfer policy registered in the packet transfer table 409. On the other hand, when the transmission source MAC address is not an address given to the authenticated terminal and when the packet is an HTTP packet, the pre-authentication transfer control part 410 transfers the packet to the URL redirection processing part 405. Further, when the transmission source MAC address is not an address given to the authenticated terminal and when the packet is not an HTTP packet, the pre-authentication transfer control part 410 transfers the packet in accordance with the transfer policy (transfer policy before authentication) within a packet transfer table.

Therefore, the HTTP packet transmitted by the terminal 600 before authentication can only access a predetermined destination (for example, authentication server 100), and cannot access another network.

The communication interface 411 is a network interface conforming to, for example, the Ethernet standards, and provides a port for inputting/outputting a packet.

The HUB 500 is a packet transfer apparatus for coupling the authentication switch 400 and the terminal 600 to each other and transferring the packet transmitted/received by the terminal 600.

The terminal 600 is a computer including a processor for executing a program, a memory for storing the program executed by the processor, a network interface, and a user interface (for example, display screen or input apparatus).

Figure 2:
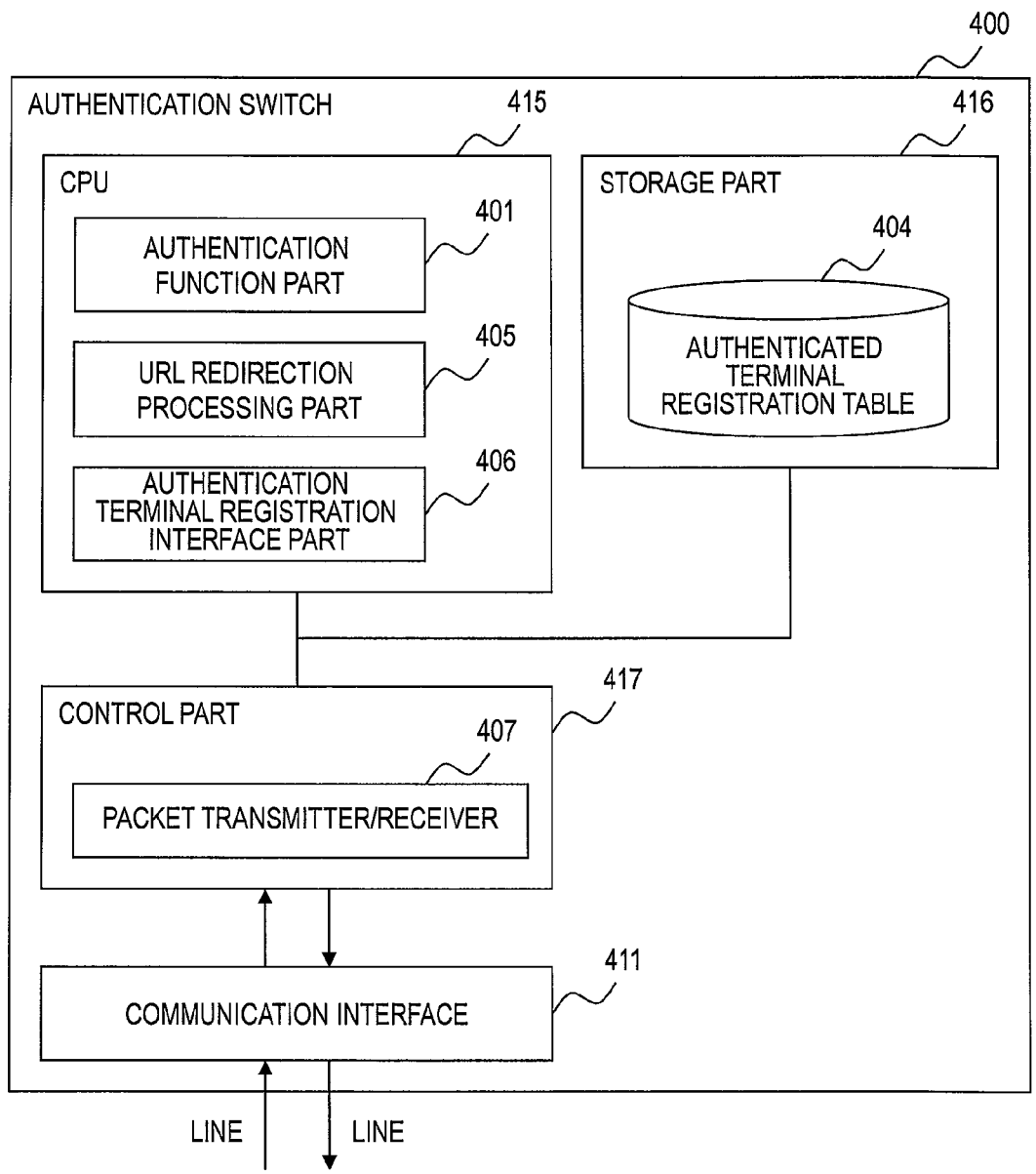
FIG. 2 is a block diagram illustrating a hardware configuration of the authentication switch according to the first embodiment.

FIG. 2 is a block diagram illustrating a hardware configuration of the authentication switch 400 according to the first embodiment.

The authentication switch 400 includes a processor 415, a storage part 416, a control part 417, and the communication interface 411.

The processor 415 executes the program stored in a memory (not shown). The processor 415 executes a predetermined program, to thereby implement each of the functions of the authentication function part 401, the URL redirection processing part 405, and the authentication terminal registration interface part 406.

The storage part 416 is, for example, a non-volatile storage apparatus such as a flash memory or a magnetic storage apparatus, and stores the program executed by the processor 415 and data (for example, authenticated terminal registration table 404) used when the program is executed. In other words, the program executed by the processor 415 is read out from the storage part 416 and loaded into the memory to be executed by the processor 415.

It should be noted that a part or all of the functions of the authentication function part 401, the URL redirection processing part 405, and the authentication terminal registration interface part 406 may be formed by hardware logic circuits.

The control part 417 has a function of the packet transmitter/receiver 407 for performing control for transferring a packet. For example, the control part 417 determines the port through which the received packet is output based on a destination address included in a header of the packet with reference to the packet transfer table 409. The control part 417 can be formed by, for example, a dedicated LSI using a logic circuit, but may be implemented by a control program executed by the processor.

The program executed by the processor 415 is provided to the authentication switch 400 via the removable medium (such as flash memory or CD-ROM) or the network, and is stored in the storage apparatus being a non-transitory storage medium. Therefore, it is preferred that the authentication switch 400 include an interface (for example, USB port or optical disc drive) for reading the removable medium.

FIG. 3 is an explanatory diagram illustrating a configuration of the authenticated terminal registration table 404 according to the first embodiment.

The authenticated terminal registration table 404 includes user information 4010, authentication terminal information 4020, and authentication switch information 4030.

The user information 4010 is the information on the authenticated user, and includes a user ID 4011, a password 4012, and a VLAN 4013. The user ID 4011 is identification information for uniquely identifying the authenticated user. The password 4012 is a password used for the authentication by the user. The VLAN 4013 is identification information for uniquely identifying the VLAN used by the user.

The authentication terminal information 4020 is the information on the authenticated terminal 600, and includes an IP address 4021, a MAC address 4022, and an access policy 4023. The IP address 4021 is an IP address given to the terminal 600 used by the user. The MAC address 4022 is a MAC address given to the terminal 600. The access policy 4023 is an access policy set for the terminal 600, and is, for example, discarding of the packet addressed to a specific destination.

The authentication switch information 4030 is the information on the authentication switch 400, and includes an IP address 4031 and a coupling port 4032. The IP address 4031 is an IP address given to the authentication switch 400 to which the terminal 600 is coupled. The coupling port 4032 is identification information on the port of the authentication switch 400 to which the terminal 600 is coupled.

Figure 4:
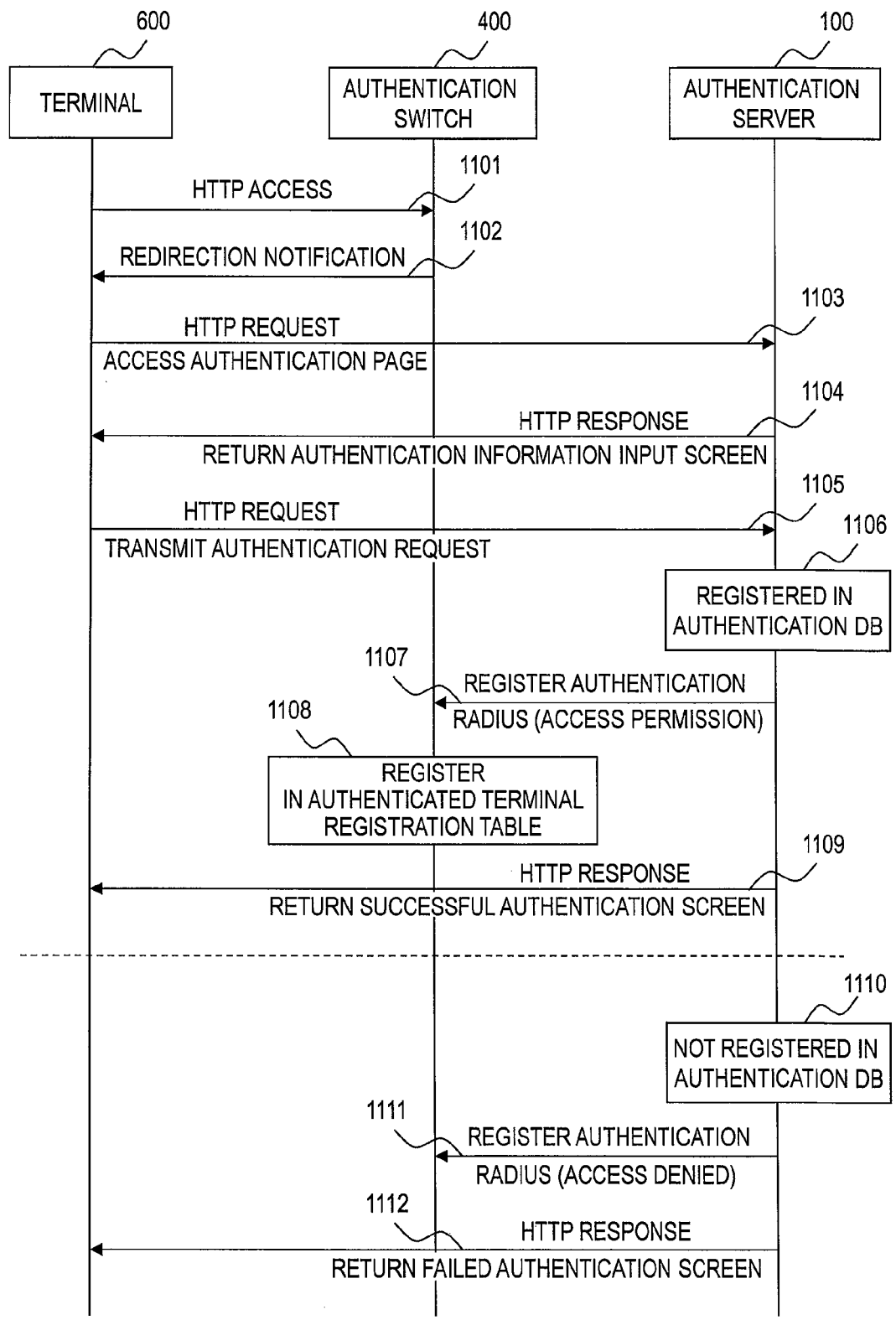
FIG. 4 is a sequence diagram according to the first embodiment.

FIG. 4 is a sequence diagram among the terminal 600, the authentication switch 400, and the authentication server 100 according to the first embodiment.

First, when being coupled to the HUB 500, the terminal 600 transmits the MAC address and the IP address given to the terminal 600 to the HUB 500. The HUB 500 transmits the MAC address and the IP address received from the terminal 600 to the authentication switch 400. The authentication switch 400 stores the address (MAC address and IP address) of the coupled terminal 600, and causes the terminal 600 to belong to the VLAN before authentication. At this time, the terminal 600 is not allowed to access the network farther than the authentication switch 400 except for the destination (in this embodiment, authentication server 100) permitted by the VLAN before authentication.

After that, in order to access the server 200, the terminal 600 transmits an HTTP request (1101). When receiving the HTTP access transmitted from the terminal 600, the authentication switch 400 determines whether or not the terminal 600 that has transmitted the HTTP access has been authenticated. When the terminal 600 that has transmitted the HTTP access is an unauthenticated terminal, the authentication switch 400 transmits a redirection notification for retransmitting the HTTP access to the authentication server 100 to the terminal 600 of a transmission source of the HTTP access (1102). The redirection notification includes the information (IP address and identification information on the port to which the terminal 600 is coupled) on the authentication switch 400.

When receiving the redirection notification, the terminal 600 transmits the HTTP request to the authentication server 100 of an access destination included in the received redirection notification, and accesses an authentication page on the authentication server 100 (1103). At this time, the terminal 600 can access the authentication server 100 by using the VLAN before authentication. The authentication server 100 transmits an HTTP response including data on an authentication information input screen to the terminal 600 that has accessed the authentication page (1104).

The user inputs authentication information (for example, user ID and password) to authentication information input screen displayed on the terminal 600. The terminal 600 transmits the input authentication information to the authentication server 100 via the authentication switch 400 (1105). The terminal 600 transmits the information on the authentication switch 400 included in the received redirection notification to the authentication server 100 along with the authentication information. It should be noted that the terminal 600 may include the information on the authentication switch 400 in the HTTP request to transmit the information to the authentication server 100 (1103).

The authentication server 100 uses the received authentication information to search the authentication database 105. When the received authentication information is registered in the authentication database 105 (1106), the authentication server 100 notifies the authentication switch 400 of successful authentication (access permission based on the RADIUS authentication) (1107).

An authentication registration notification addressed to the authentication switch 400 includes information on the successful authentication and the access control information (for example, information on the VLAN to which the authenticated terminal 600 is to belong). The authentication switch 400 performs authorization processing for the MAC address of the authenticated terminal 600, and registers the authentication result in the authenticated terminal registration table 404 (1108). After the registration in the authenticated terminal registration table 404, the authenticated terminal 600 belongs to the VLAN designated by the authentication server 100.

Further, the authentication server 100 notifies the terminal 600 that the authentication is successful (1109). When receiving the notification that the authentication is successful, the terminal 600 displays a successful authentication screen.

On the other hand, when the received authentication information is not registered in the authentication database 105 (1110), the authentication server 100 notifies the authentication switch 400 of the failed authentication (access denied based on the RADIUS authentication) (1111). The authentication switch 400 does not necessarily register the information on the failed authentication in the authenticated terminal registration table 404.

Further, the authentication server 100 returns a notification of the failed authentication to the terminal 600 (1112). When receiving the notification of the failed authentication, the terminal 600 displays a failed authentication screen.

Figure 5:
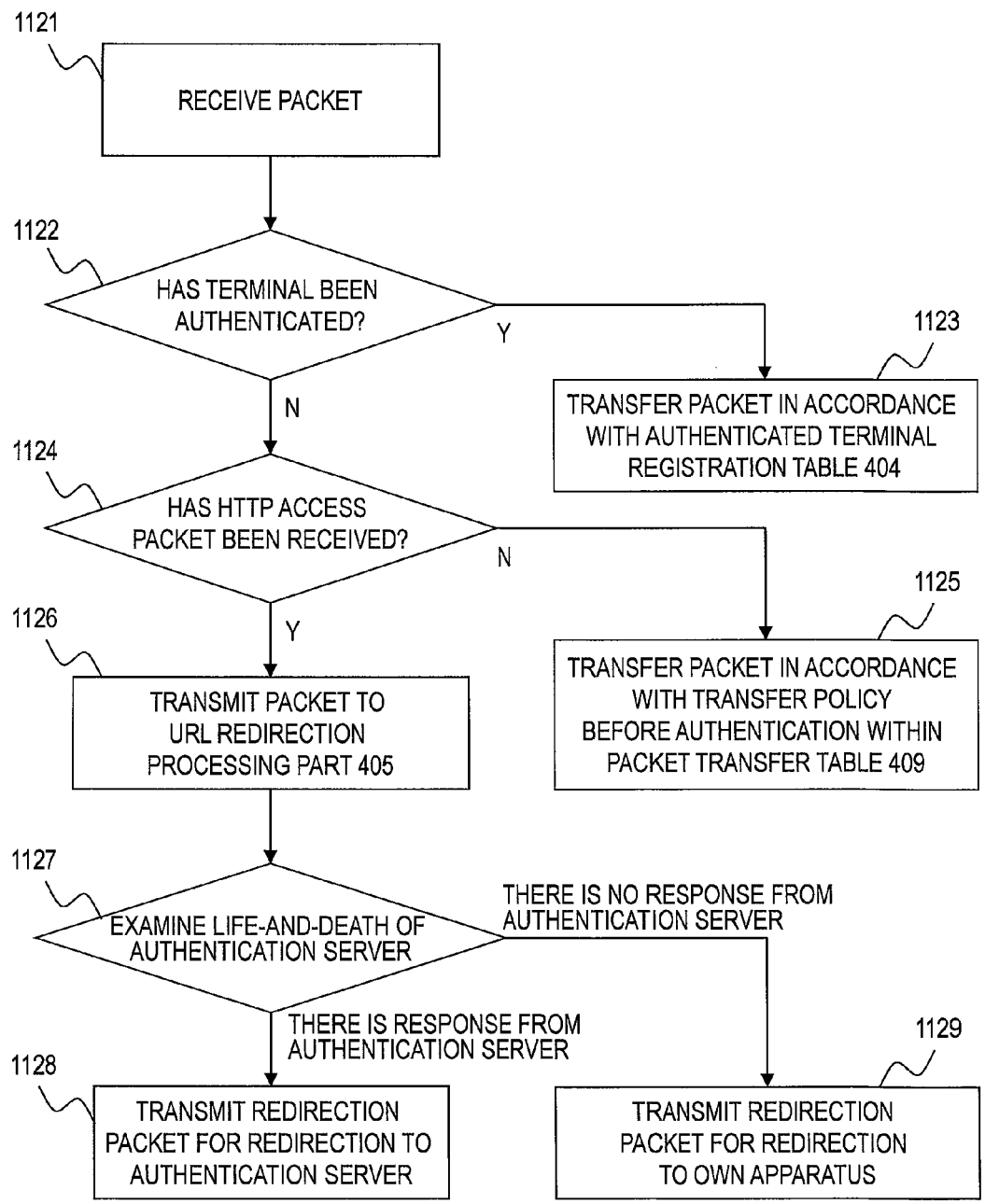
FIG. 5 is a flowchart of packet transfer processing according to the first embodiment.

FIG. 5 is a flowchart of packet transfer processing executed by the authentication switch 400 according to the first embodiment.

First, when receiving a packet (1121), the packet transmitter/receiver 407 uses the MAC address or the IP address of the transmission source of the received packet to search the authenticated terminal registration table 404, and determines whether or not the terminal 600 that has transmitted the received packet is an authenticated terminal (1122).

When the terminal 600 that has transmitted the packet is an authenticated terminal, the packet transmitter/receiver 407 transfers the received packet in accordance with the transfer policy (for example, VLAN) registered in the authenticated terminal registration table 404 (1123). On the other hand, when the terminal 600 that has transmitted the packet is not an authenticated terminal, the packet transmitter/receiver 407 determines a type of the received packet (1124).

As a result, when the received packet is not an HTTP access, the pre-authentication transfer control part 410 transfers the packet in accordance with the transfer policy before authentication registered in the packet transfer table 409 (1125). On the other hand, when the received packet is an HTTP access, the packet transmitter/receiver 407 transfers the packet to the URL redirection processing part 405 (1126).

After that, the packet transmitter/receiver 407 examines life-and-death of the authentication server (1127). As a result, when there is a response from the authentication server, the URL redirection processing part 405 generates a redirection packet for redirection to the authentication server 100, and transmits the redirection packet to the terminal 600 that has transmitted the packet (1128).

On the other hand, when there is no response from the authentication server, the URL redirection processing part 405 generates a redirection packet for redirection to the own apparatus, and transmits the redirection packet to the terminal 600 that has transmitted the packet (1129).

The redirection packets generated in Steps 1128 and 1129 each store the IP address of the authentication switch 400, the information on the physical port to which the terminal 600 is coupled, the MAC address and the IP address of the terminal 600, and the like.

Figure 6:
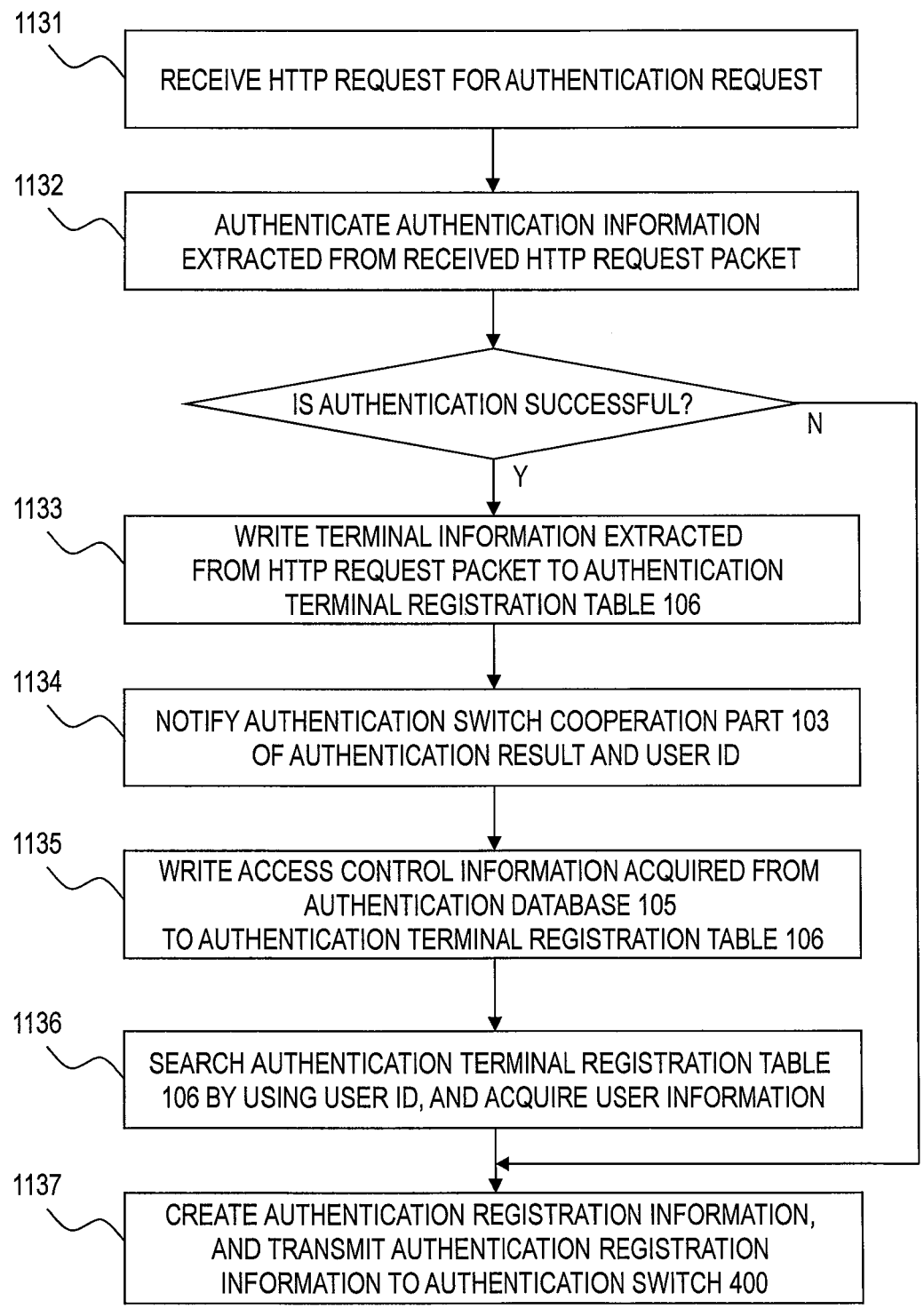
FIG. 6 is a flowchart of authentication processing according to the first embodiment.

FIG. 6 is a flowchart of authentication processing according to the first embodiment. The authentication processing illustrated in FIG. 6 is executed by the processor of the authentication server 100.

First, the authentication function main part 102 stands by until the communication interface 108 receives the HTTP request for the authentication request (1131). The authentication function main part 102 extracts the authentication information (user ID and password) from the received HTTP request, and uses the authentication database 105 to attempt to authenticate the extracted authentication information (1132).

As a result, when the authentication is successful, the authentication function main part 102 extracts terminal information from the HTTP request, and writes the extracted terminal information to the authentication terminal registration table 106 (1133). After that, the authentication function main part 102 notifies the authentication switch cooperation part 103 of the authentication result and the user ID (1134).

The authentication switch cooperation part 103 uses the authentication result and the user ID that have been received from the authentication function main part 102 to search the authentication database 105, acquires the access control information on the user, and writes the acquired access control information to the authentication terminal registration table 106 (1135). Then, the authentication switch cooperation part 103 uses the received user ID to search the authentication terminal registration table 106, and acquires the information on the user (1136).

In addition, the authentication switch cooperation part 103 creates authentication registration information from the acquired information on the user, and sends the created authentication registration information to the authentication registration interface 104. The authentication registration interface 104 transmits the received authentication registration information to the authentication switch 400 (1137).

It should be noted that an authentication method described above can be combined with a conventional Web authentication function using the authentication switch 400 as a proxy. For example, in the authentication switch 400, a mode of using the Web authentication function and a mode of using the authentication server 100 may be switched over. Further, an enabled/disabled state of the Web authentication function of the authentication switch 400 may be controlled depending on a status of the authentication server 100.

Specifically, in Step 1127 of the transfer processing described above, the URL redirection processing part 405 examines the status of the authentication server 100. When there is no response from the authentication server 100, the URL redirection processing part 405 enables the Web authentication function of the own apparatus, and responds to the terminal 600 that has accessed by setting the own apparatus as a redirection destination (1129).

As described above, in the first embodiment, the authentication sequence between the terminal 600 and the authentication switch 400 is switched over to the authentication sequence between the terminal 600 and the authentication server 100 based on the redirection notification transmitted in 1102 by the authentication switch 400. Therefore, the authentication server 100 is allowed to know the authentication switch 400 to which the terminal 600 is coupled, and can register the authentication result in the authentication switch 400 via the authentication terminal registration interface part 406. In particular, without snooping the authentication sequence between the terminal and the authentication server as in JP 2010-62667 A described above, the authentication server 100 can register the authentication result in the authentication switch 400. In addition, the authentication switch 400 can manage the registered terminal 600 as the terminal that has been subjected to the network authentication.

Further, the authentication switch does not need to operate a Web server to relay the authentication information to the authentication server, and hence it is possible to detect the authenticated terminal while reducing the load imposed on the authentication switch 400 due to the authentication processing, and to check whether or not the authenticated terminal has left the network. Therefore, it is possible to erase authentication information, filter information, and a QoS setting that are unnecessary from the authentication switch, thereby effectively using a storage area of the authentication switch. Further, by eliminating coupling of the terminal spoofing the authenticated MAC address, it is possible to improve security.

Further, when the authentication switch has an authentication proxy function, it is necessary to provide a module for each network authentication mode, but according to the first embodiment, it is possible to build a network authentication system independent of the network authentication mode.

Second Embodiment

Next, a second embodiment of this invention is described. In the second embodiment, by sending the HTTP access transmitted from the terminal 600 to the authentication server 100 through tunneling, the authentication server 100 is notified of the information on the terminal 600 and the authentication switch 400. Therefore, the authentication switch 400 and the authentication server 100 according to the second embodiment have configurations different from those according to the first embodiment illustrated in FIG. 1. It should be noted that only components, functions, and processing different from those of the first embodiment described above are described in the second embodiment, and descriptions of the same parts are omitted.

Figure 7:
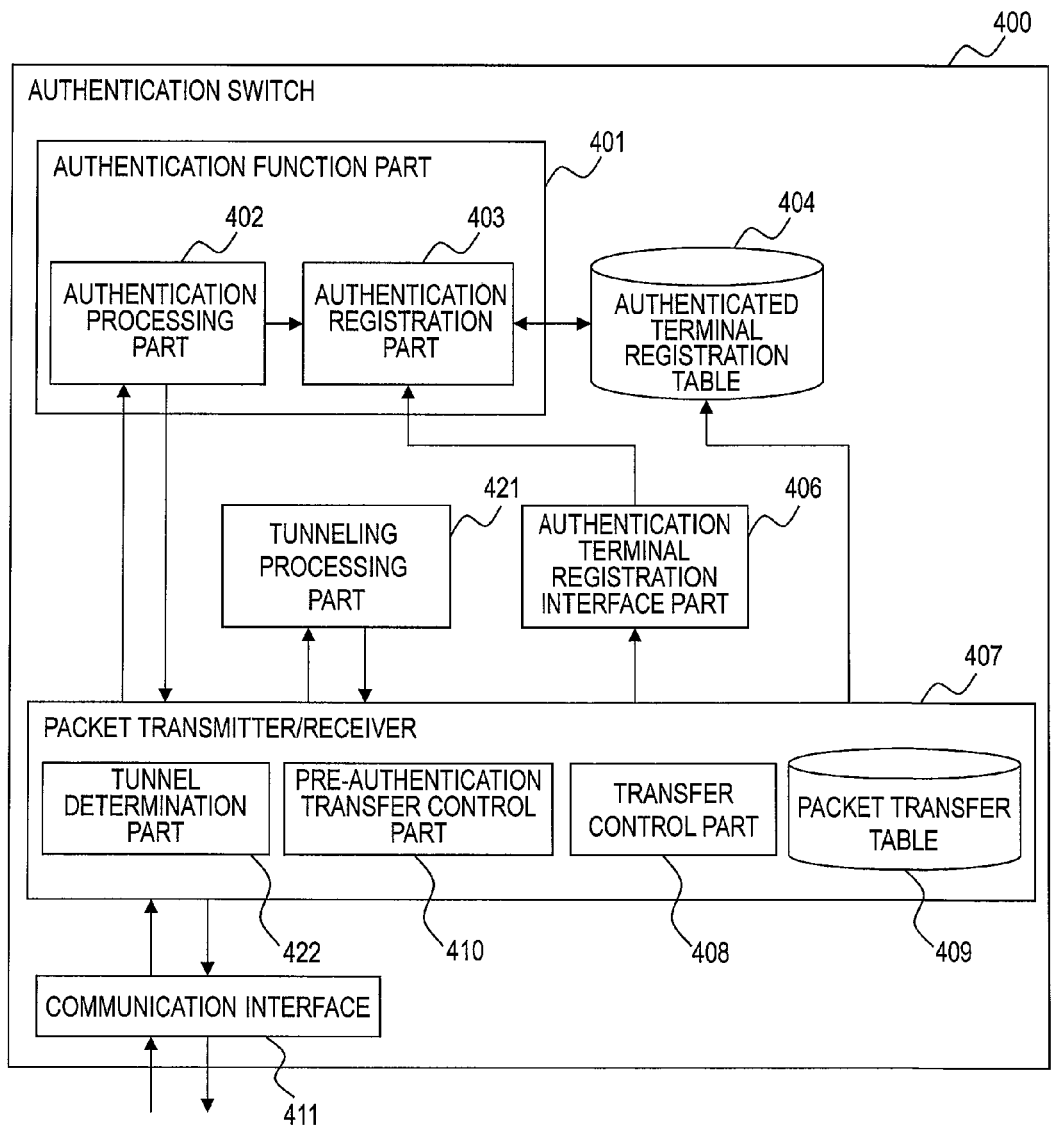
FIG. 7 is a block diagram illustrating a configuration of the authentication switch according to a second embodiment.

FIG. 7 is a block diagram illustrating a configuration of the authentication switch 400 according to the second embodiment.

The authentication switch 400 according to the second embodiment includes the authentication function part 401, the authenticated terminal registration table 404, the URL redirection processing part 405, the authentication terminal registration interface part 406, the packet transmitter/receiver 407, the communication interface 411, and a tunneling processing part 421.

The authentication function part 401, the authenticated terminal registration table 404, the URL redirection processing part 405, and the authentication terminal registration interface part 406 have the same configurations or structure and the same functions as those according to the first embodiment described above.

The tunneling processing part 421 uses a tunnel set between the authentication switch 400 and the authentication server 100 to transfer the HTTP packet between the terminal 600 and the authentication server 100. Further, the tunneling processing part 421 performs decapsulating processing by removing the header from the encapsulated packet.

The packet transmitter/receiver 407 provides the packet transmission/reception function for receiving a packet and transmitting the received packet. The packet transmitter/receiver 407 includes the transfer control part 408, the packet transfer table 409, the pre-authentication transfer control part 410, and a tunnel determination part 422.

The transfer control part 408, the packet transfer table 409, the pre-authentication transfer control part 410, and the communication interface 411 have the same configurations or structure and the same functions as those according to the first embodiment described above.

The tunnel determination part 422 determines a packet that has been encapsulated and transferred through the tunnel, and sends the packet to the tunneling processing part 421.

Figure 8:
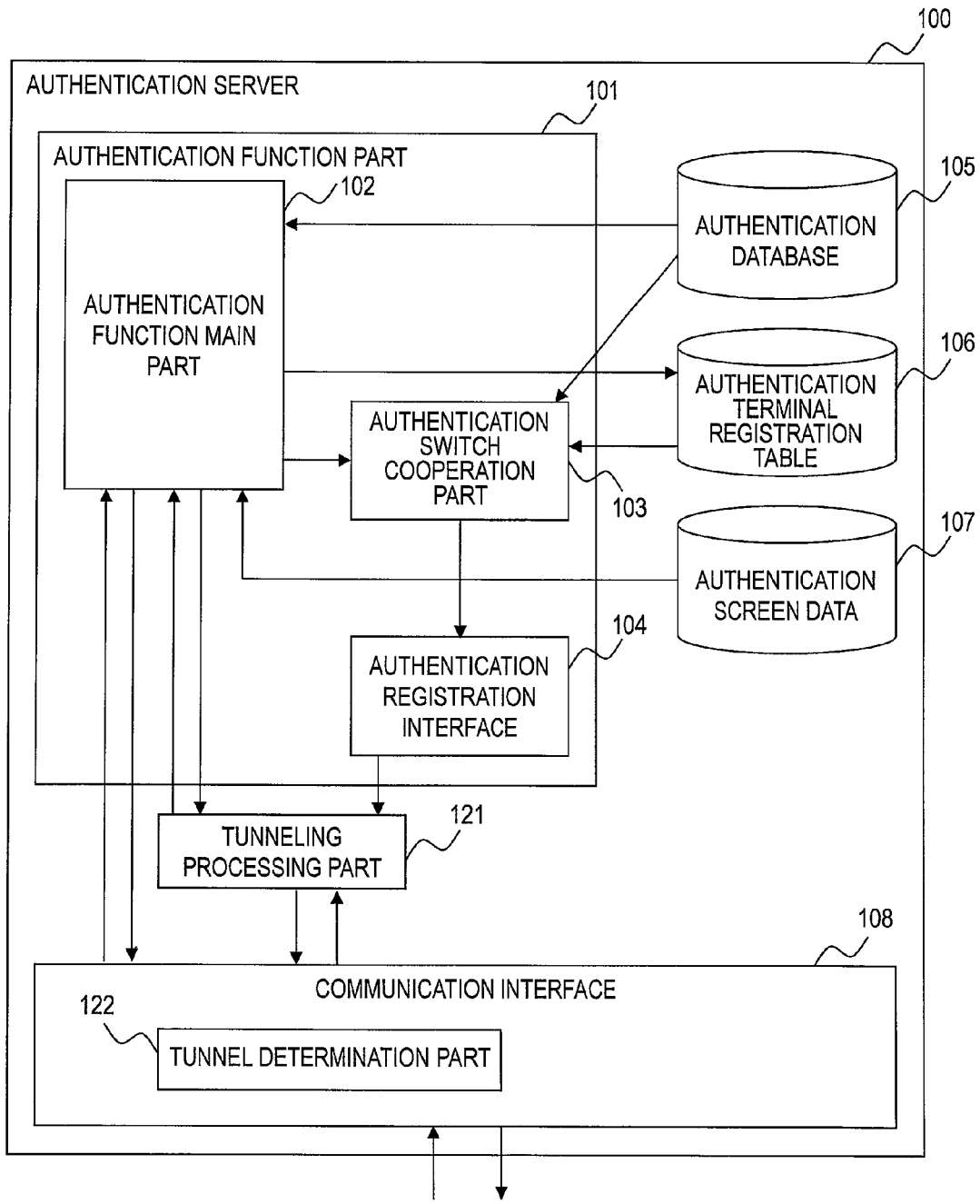
FIG. 8 is a block diagram illustrating a configuration of the authentication server according to the second embodiment.

FIG. 8 is a block diagram illustrating a configuration of the authentication server 100 according to the second embodiment.

The authentication server 100 is the computer including the processor for executing the program, the memory for storing the program executed by the processor, the storage apparatus for storing data used when the program is executed, and a communication interface coupled to the network.

The authentication server 100 according to the second embodiment includes the authentication function part 101, the authentication database 105, the authentication terminal registration table 106, the authentication screen data 107, the communication interface 108, and a tunneling processing part 121.

The authentication function part 101, the authentication database 105, the authentication terminal registration table 106, the authentication screen data 107, and the communication interface 108 have the same configurations or structures and the same functions as those according to the first embodiment described above.

The tunneling processing part 121 uses the tunnel set between the authentication switch 400 and the authentication server 100 to transfer the HTTP packet between the terminal 600 and the authentication server 100. Further, the tunneling processing part 121 performs the decapsulating processing by removing the header from the encapsulated packet.

The communication interface 108 is the network interface having the function of transmitting/receiving packets in conformity to, for example, the Ethernet standards. Further, the communication interface 108 includes a tunnel determination part 122. The tunnel determination part 122 determines the packet that has been encapsulated and transferred through the tunnel, and sends the packet to the tunneling processing part 121.

Figure 9:
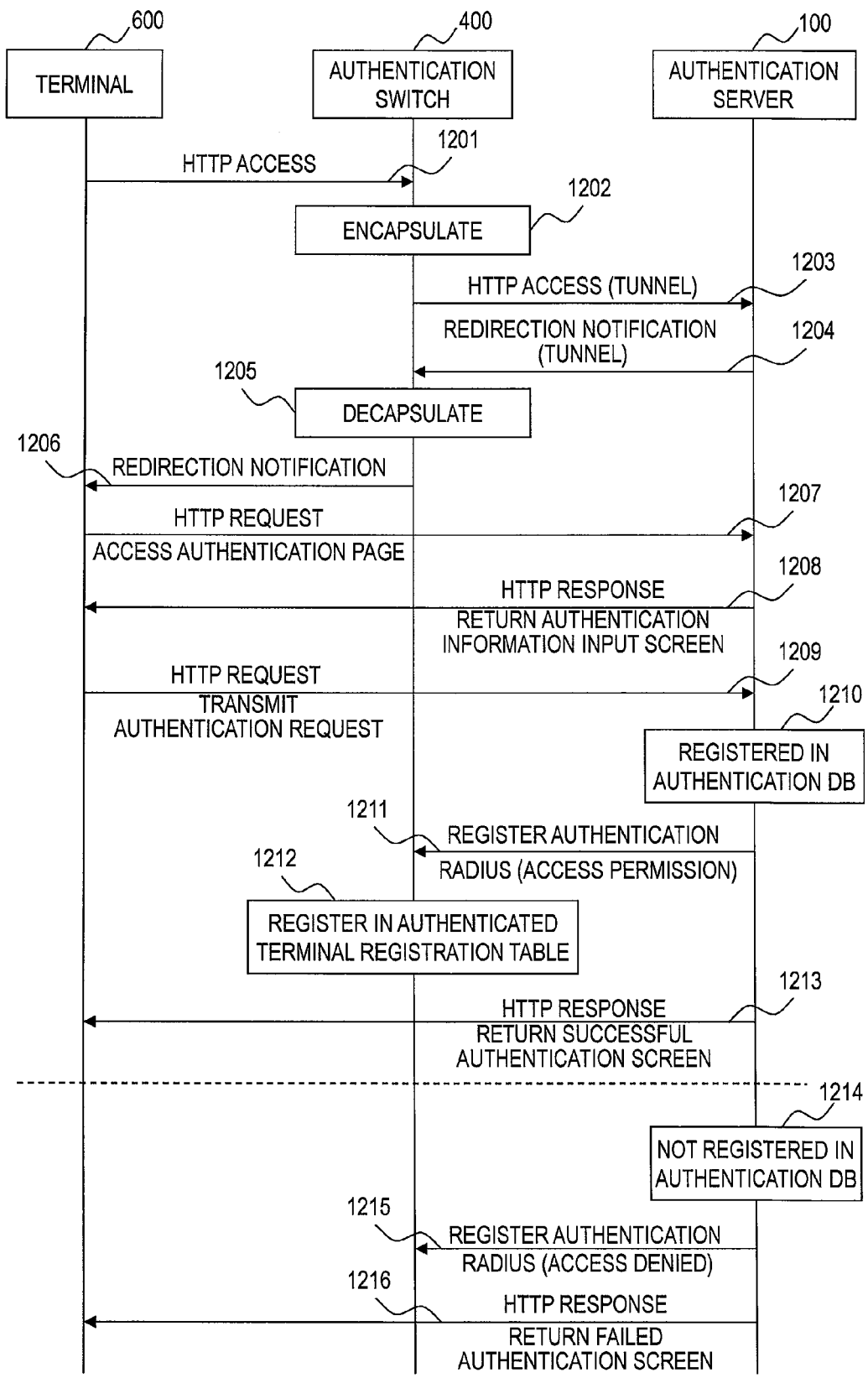
FIG. 9 is a sequence diagram according to the second embodiment.

FIG. 9 is a sequence diagram among the terminal 600, the authentication switch 400, and the authentication server 100 according to the second embodiment.

First, in order to access the server 200, the terminal 600 transmits an HTTP request (1201). When receiving the HTTP access transmitted from the terminal 600, the authentication switch 400 determines whether or not the terminal 600 that has transmitted the HTTP access has been authenticated. Then, when the terminal 600 that has transmitted the HTTP access is an unauthenticated terminal, the authentication switch 400 stores the address (MAC address and IP address) of the coupled terminal 600, and causes the terminal 600 to belong to the VLAN before authentication. At this time, the terminal 600 is not allowed to access the network farther than the authentication switch 400 except for the destination (in this embodiment, authentication server 100) permitted by the VLAN before authentication.

Further, the authentication switch 400 encapsulates the received packet (HTTP access) by using a header in which the IP address of the authentication switch 400 is set as the transmission source and the IP address of the authentication server 100 is set as the destination (1202). Then, the authentication switch 400 transmits the encapsulated HTTP access through the tunnel set between the authentication switch 400 and the authentication server 100 (1203). The HTTP access transmitted to the authentication server 100 includes the information (IP address and identification information on the port to which the terminal 600 is coupled) on the authentication switch 400.

When receiving the encapsulated HTTP access, the authentication server 100 performs processing for removing an encapsulating header from the encapsulated packet, and creates the redirection notification for retransmitting the HTTP access to the authentication server 100. Then, the authentication server 100 encapsulates the created redirection notification, and transmits the encapsulated redirection notification to the authentication switch 400 of the transmission source of the HTTP access through the tunnel set between the authentication server 100 and the authentication switch 400 (1204). The redirection notification transmitted from the authentication server 100 includes the information on the authentication server 100 being a redirection destination.

When receiving the encapsulated redirection notification, the authentication switch 400 decapsulates the received redirection notification by removing the encapsulating header therefrom (1205), and transmits the decapsulated redirection notification to the terminal 600 of the transmission source of the HTTP access (1206).

When receiving the redirection notification, the terminal 600 transmits the HTTP request to the authentication server 100 of an access destination included in the received redirection notification, and accesses an authentication page on the authentication server 100 (1207). The authentication server 100 transmits an HTTP response including data on an authentication information input screen to the terminal 600 that has accessed the authentication page (1208).

The processing from 1209 to 1216 is the same as the processing of 1105 to 1112 according to the first embodiment.

Figure 10:
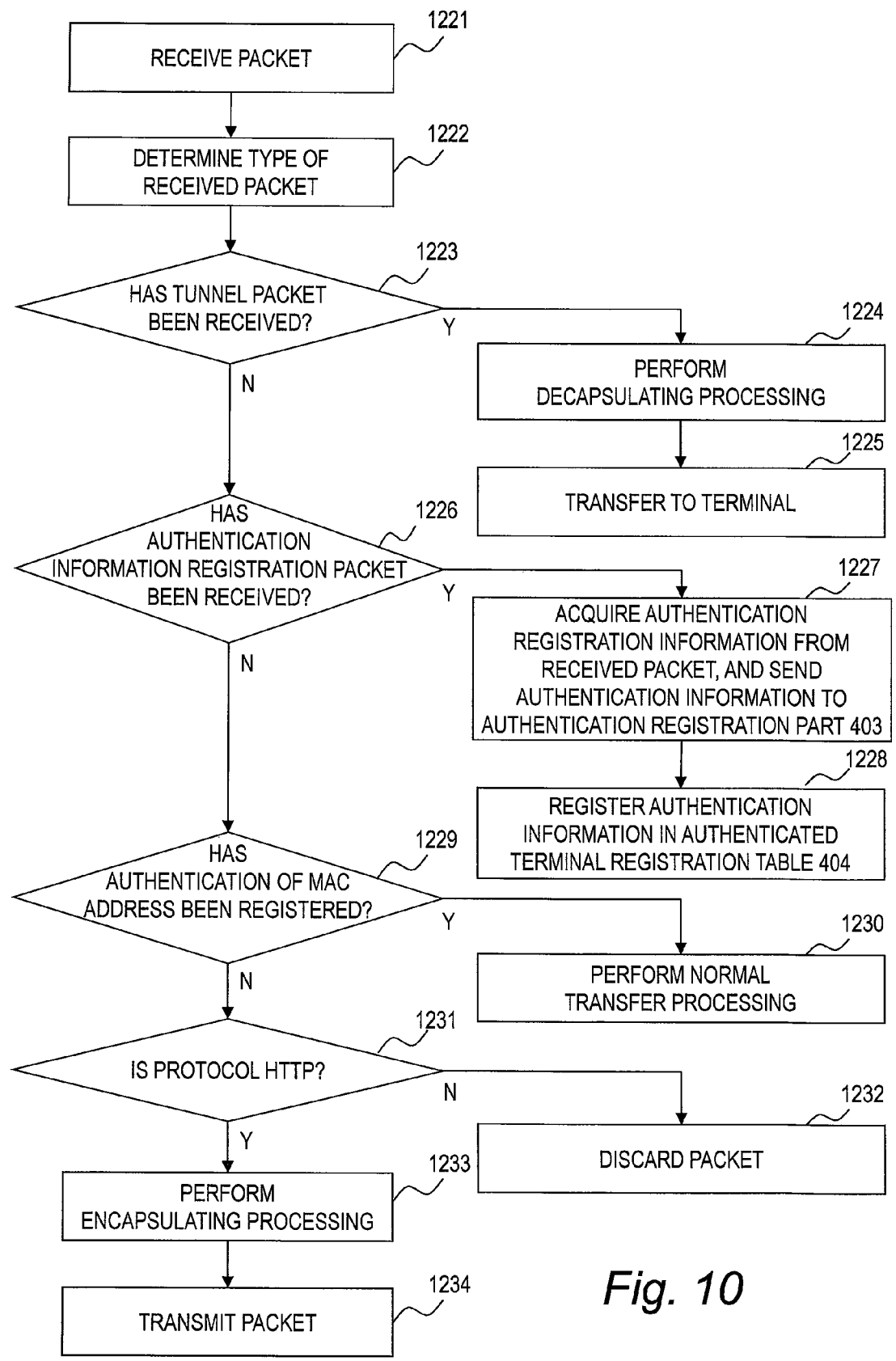
FIG. 10 is a flowchart of packet transfer processing according to the second embodiment.

FIG. 10 is a flowchart of packet transfer processing executed by the authentication switch 400 according to the second embodiment.

First, when the packet transmitter/receiver 407 receives the packet (1221), the tunnel determination part 422 refers to the header of the received packet to determine the type of the received packet (1222).

As a result, when the received packet is a tunnel packet (Y in 1223), the tunnel determination part 422 sends the received packet to the tunneling processing part 421. The tunneling processing part 421 decapsulates the received packet by removing the encapsulating header therefrom (1224). The packet transmitter/receiver 407 transfers the decapsulated packet to the terminal 600 based on the header (1225).

On the other hand, when the received packet is not a tunnel packet (N in 1223), the tunnel determination part 422 determines whether or not the received packet is an authentication information registration packet (1226).

As a result, when the received packet is an authentication information registration packet (Y in 1226), the tunnel determination part 422 sends the received packet to the authentication terminal registration interface part 406. The authentication terminal registration interface part 406 acquires the authentication registration information from the received packet, and sends the acquired authentication information to the authentication registration part 403 (1227). The authentication registration part 403 registers the received authentication information in the authenticated terminal registration table 404 (1228).

On the other hand, when the received packet is not an authentication information registration packet (N in 1226), the tunnel determination part 422 refers to the authenticated terminal registration table 404 to determine whether or not the MAC address of the received packet is the address of the authenticated terminal (1229).

As a result, when the MAC address of the received packet is the address of the authenticated terminal, the transfer control part 408 refers to the packet transfer table 409 to transfer the received packet based on the destination address included in the header of the packet (1230).

On the other hand, when the MAC address of the received packet is not the address of the authenticated terminal (N in 1229), the tunnel determination part 422 determines a protocol of the received packet (1231).

As a result, when the protocol of the received packet is not an HTTP protocol, the packet transmitter/receiver 407 determines that the received packet does not need to be transferred, and discards the packet (1232). On the other hand, when the protocol of the received packet is an HTTP protocol, the tunneling processing part 421 executes encapsulating processing for encapsulating the received packet by using the header in which the IP address of the authentication server 100 is set as the destination (1233). Then, the packet transmitter/receiver 407 transmits the encapsulated packet to the authentication server 100 (1234).

Figure 11A:
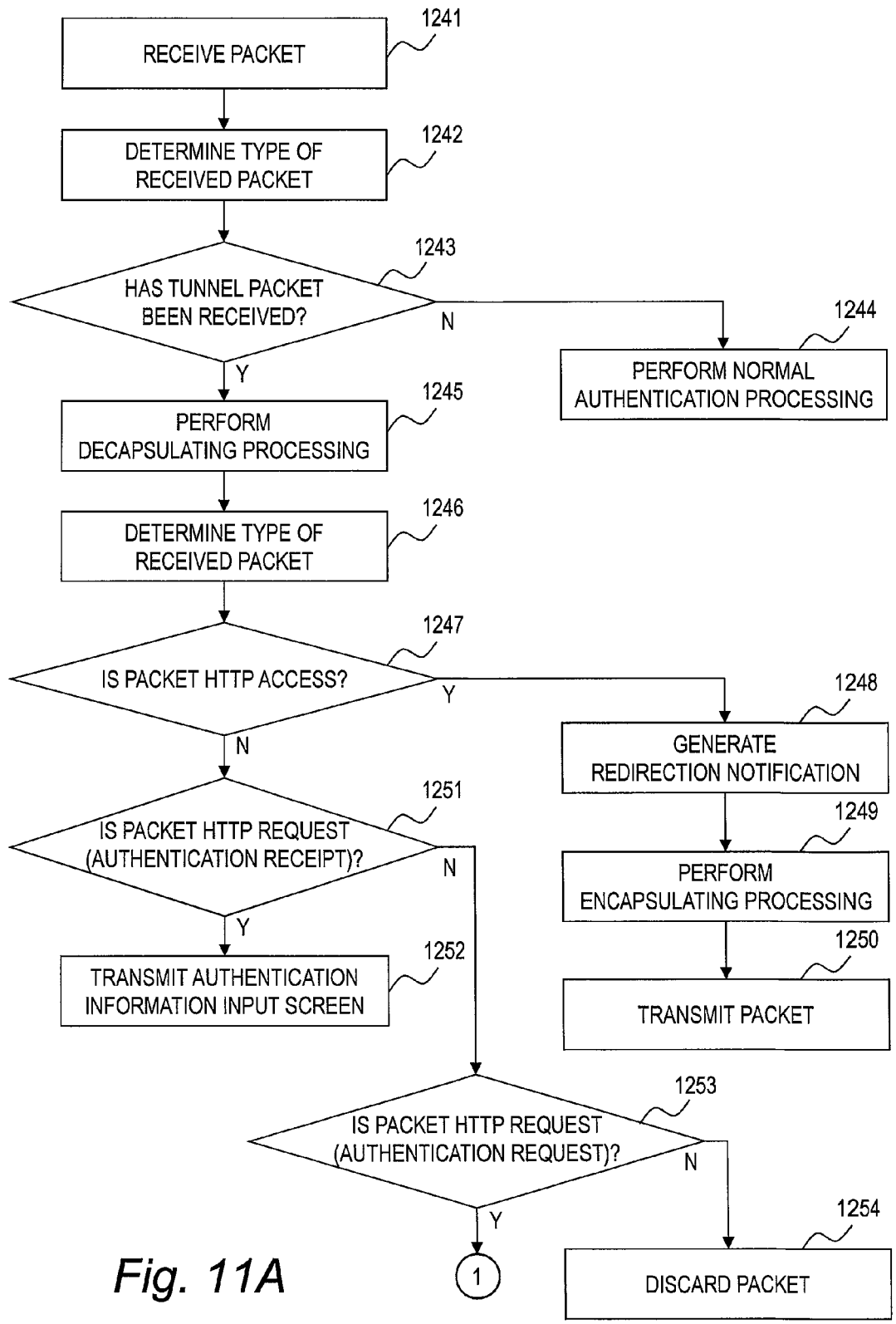
FIGS. 11A and 11B are flowcharts of authentication processing according to the second embodiment.
Figure 11B:
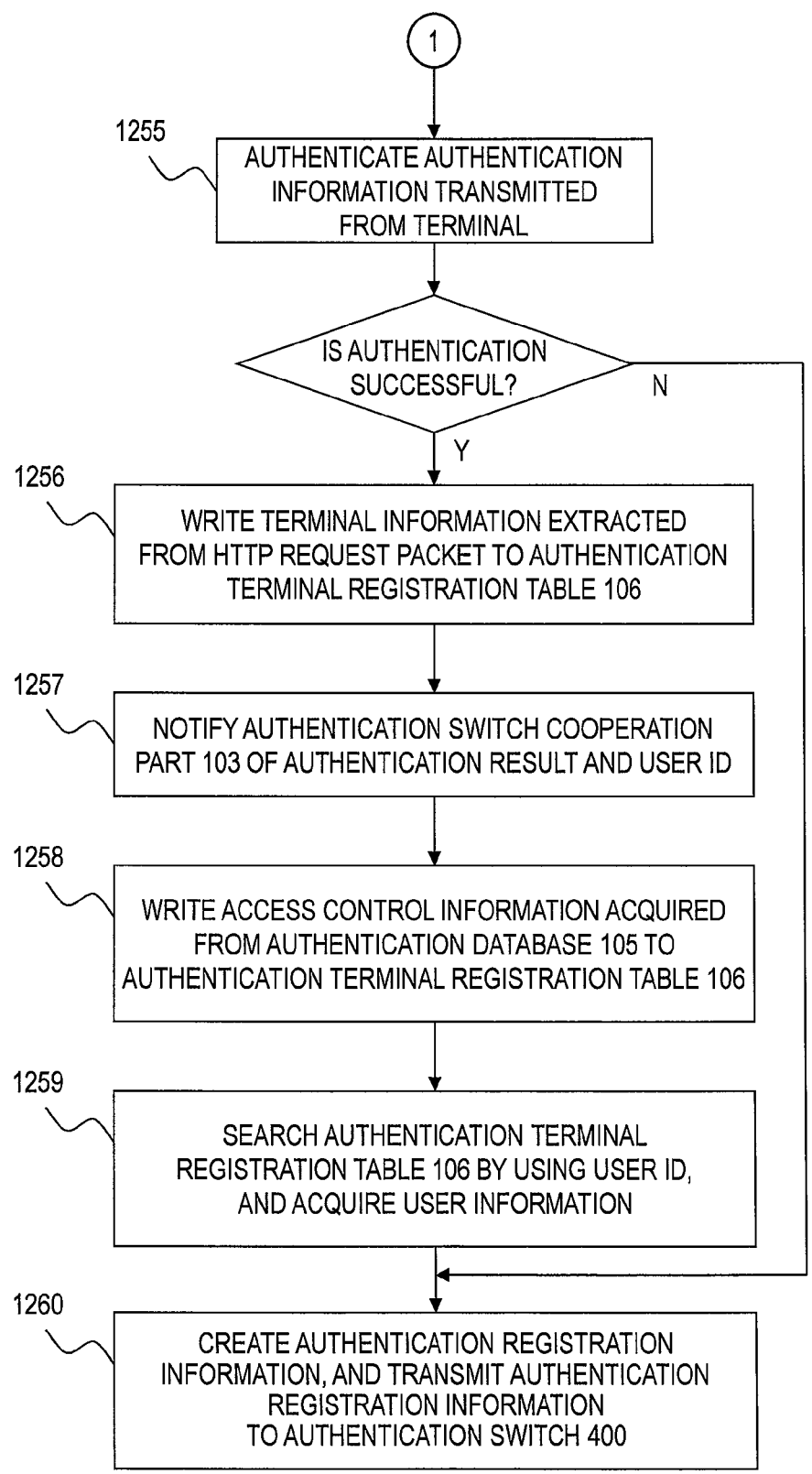

FIGS. 11A and 11B are flowcharts of authentication processing according to the second embodiment. The authentication processing illustrated in FIGS. 11A and 11B is executed by the processor of the authentication server 100.

First, when the communication interface 108 receives the packet (1241), the tunnel determination part 122 refers to the header of the received packet to determine the type of the received packet (1242).

As a result, when the received packet is not a tunnel packet (N in 1243), the authentication function main part 102 executes normal authentication processing for extracting the authentication information from the received packet and searching the authentication database 105 by using the extracted authentication information (1244).

On the other hand, when the received packet is a tunnel packet (Y in 1243), the tunnel determination part 122 sends the received packet to the tunneling processing part 121. The tunneling processing part 121 executes the decapsulating processing for decapsulating the received packet by removing the encapsulating header therefrom (1245), and determines the type of the decapsulated packet (1246).

As a result, when the decapsulated packet is an HTTP access (Y in 1247), the tunneling processing part 121 sends the received packet to the authentication function main part 102. The authentication function main part 102 generates the redirection notification for retransmitting the HTTP access to the authentication server 100, and sends the generated redirection notification to the tunneling processing part 121 (1248).

The tunneling processing part 121 encapsulates the generated redirection notification by using the header in which the IP address of the authentication switch 400 is set as the destination, and sends the encapsulated packet to the communication interface 108 (1249). The communication interface 108 transmits the encapsulated packet to the authentication switch 400 (1250).

On the other hand, when the decapsulated packet is not an HTTP access (N in 1247), the tunneling processing part 121 determines whether or not the decapsulated packet is an HTTP request for authentication receipt (1251).

As a result, when the decapsulated packet is an HTTP request for authentication receipt (Y in 1251), the tunneling processing part 121 sends the received packet to the authentication function main part 102. The authentication function main part 102 transmits the HTTP response including data on the authentication information input screen acquired from the authentication screen data 107 to the terminal 600 that has transmitted the HTTP request (1252). On the other hand, when the decapsulated packet is not an HTTP request for authentication receipt (N in 1251), the procedure advances to Step 1253.

In Step 1253, the tunneling processing part 121 determines whether or not the decapsulated packet is an HTTP request for the authentication request (1253).

As a result, when the decapsulated packet is not an HTTP request for the authentication request (N in 1253), the packet does not need to be processed, and hence the authentication function main part 102 discards the received packet (decapsulated packet) (1254).

On the other hand, when the decapsulated packet is the HTTP request for the authentication request (Y in 1253), the authentication function main part 102 uses the authentication database 105 to attempt to authenticate the authentication information (user ID and password) transmitted from the terminal 600 (1255).

The processing (1256 to 1260) performed when the authentication is successful is the same as the processing of 1133 to 1137 according to the first embodiment.

As described above, in addition to the above-mentioned effects of the first embodiment, in the second embodiment, the authentication sequence between the terminal 600 and the authentication switch 400 is switched over to the authentication sequence between the terminal 600 and the authentication server 100 based on the redirection notification transmitted in 1204 and 1206 by the authentication server 100. Therefore, the authentication server 100 is allowed to know the authentication switch 400 to which the terminal 600 is coupled, and can register the authentication result in the authentication switch 400 via the authentication terminal registration interface part 406. In addition, the authentication switch 400 can manage the registered terminal 600 as the terminal that has been subjected to the network authentication.

Third Embodiment

Next, a third embodiment of this invention is described. In the third embodiment, a service provider (SP) based on the Shibboleth authentication is set as the authentication server, and the service provider transmits the redirection notification, to thereby realize authentication between the terminal and an identity provider (IdP). It should be noted that only components, functions, and processing different from those of the first or second embodiment described above are described in the third embodiment, and descriptions of the same parts are omitted.

The Shibboleth authentication represents an authentication system for realizing a single sign-on (SSO) environment in which an identity provider (IdP) 250 provides the information on the user and a service provider (SP) 150 uses the information provided by the identity provider to permit communications.

The authentication system according to the third embodiment includes the service provider 150, the identity provider 250, the L3 switch 300, at least one authentication switch 400, and at least one HUB 500. The HUB 500 serves to couple at least one terminal 600 thereto. In other words, the authentication system according to the third embodiment is obtained by replacing the authentication server 100 and the server 200 within the authentication system according to the first embodiment illustrated in FIG. 1 by the service provider 150 and the identity provider 250, respectively.

Figure 12:
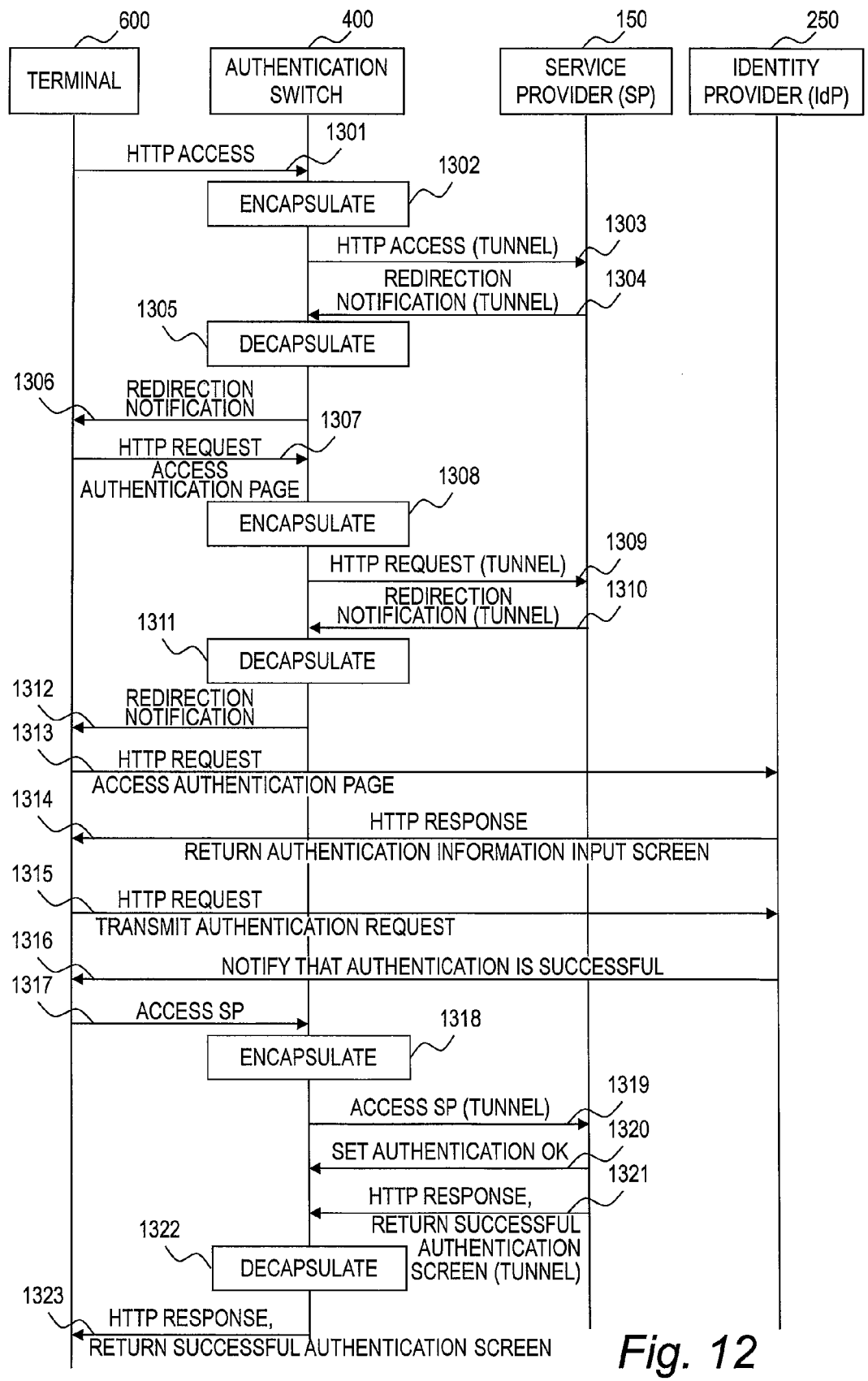
FIG. 12 is a sequence diagram according to a third embodiment.

FIG. 12 is a sequence diagram among the terminal 600, the authentication switch 400, the service provider (SP) 150, and the identity provider (IdP) 250 according to the third embodiment.

First, in order to access the server 200, the terminal 600 transmits an HTTP request (1301). When receiving the HTTP access transmitted from the terminal 600, the authentication switch 400 determines whether or not the terminal 600 that has transmitted the HTTP access has been authenticated. When the terminal 600 that has transmitted the HTTP access is an unauthenticated terminal, the authentication switch 400 stores the address (MAC address and IP address) of the coupled terminal 600, and causes the coupled terminal 600 to belong to the VLAN before authentication. At this time, the terminal 600 is not allowed to access the network farther than the authentication switch 400 except for the destination (in this embodiment, service provider 150) permitted by the VLAN before authentication.

Further, the authentication switch 400 encapsulates the received packet (HTTP access) by using the header in which the IP address of the authentication switch 400 is set as the transmission source and the IP address of the service provider 150 is set as the destination (1302). Then, the authentication switch 400 transmits the encapsulated HTTP access through the tunnel set between the authentication switch 400 and the service provider 150 (1303). The HTTP access transmitted to the service provider 150 includes the information on the authentication switch 400.

When receiving the encapsulated HTTP access, the service provider 150 performs the processing for removing the encapsulating header from the encapsulated packet, and creates the redirection notification for retransmitting the HTTP access to the service provider 150. Then, the service provider 150 encapsulates the created redirection notification, and transmits the encapsulated redirection notification through the tunnel set between the service provider 150 and the authentication switch 400 (1304). The redirection notification transmitted from the service provider 150 includes the information on the service provider 150.

When receiving the encapsulated redirection notification, the authentication switch 400 decapsulates the received redirection notification by removing the encapsulating header therefrom (1305), and transmits the decapsulated redirection notification to the terminal 600 of the transmission source of the HTTP access (1306).

When receiving the redirection notification, the terminal 600 transmits the HTTP request for access to the authentication page to the service provider 150 of an access destination included in the redirection notification (1307).

The authentication switch 400 encapsulates the received packet (HTTP request) by using the header in which the IP address of the authentication switch 400 is set as the transmission source and the IP address of the service provider 150 is set as the destination (1308). Then, the authentication switch 400 transmits the encapsulated HTTP request through the tunnel set between the authentication switch 400 and the service provider 150 (1309).

When receiving the encapsulated HTTP request, the service provider 150 performs decapsulating processing for removing the encapsulating header from the encapsulated packet, and creates the redirection notification for retransmitting the HTTP request to the identity provider 250. Then, the service provider 150 encapsulates the created redirection notification, and transmits the encapsulated redirection notification through the tunnel set between the service provider 150 and the authentication switch 400 (1310). The redirection notification transmitted from the service provider 150 includes the information on the identity provider 250.

When receiving the encapsulated redirection notification, the authentication switch 400 decapsulates the received redirection notification by removing the encapsulating header therefrom (1311), and transmits the decapsulated redirection notification to the terminal 600 of the transmission source of the HTTP request (1312).

When receiving the redirection notification, the terminal 600 transmits the HTTP request for access to the authentication page to the identity provider 250 of an access destination included in the redirection notification, and accesses the Shibboleth authentication system (1313).

It should be noted that, with regard to communications between the terminal 600 before authentication and the identity provider 250, tunneling processing performed by the authentication switch 400 is avoided by setting a filter for forwarding a packet in the authentication switch 400.

The identity provider 250 transmits the HTTP response including data on the authentication information input screen to the terminal 600 that has accessed the authentication page (1314).

The user inputs the authentication information (for example, user ID and password) to the authentication information input screen displayed on the terminal 600. The terminal 600 transmits the input authentication information to the identity provider 250 via the authentication switch 400 (1315).

The identity provider 250 uses the received authentication information to search an authentication database. When the received authentication information is registered in the authentication database, the identity provider 250 notifies the terminal 600 that the authentication is successful (1316). A notification of the successful authentication addressed to the terminal 600 includes the information on the successful authentication and the redirection information to the service provider 150.

The terminal 600 transmits a packet for access to the service provider 150 in accordance with the redirection information included in the received notification of the successful authentication (1317). The packet transmitted by the terminal 600 includes the information on the successful authentication of the terminal 600.

The authentication switch 400 encapsulates the received packet by using the header in which the IP address of the authentication switch 400 is set as the transmission source and the IP address of the service provider 150 is set as the destination (1318). Then, the authentication switch 400 transmits the encapsulated packet through the tunnel set between the authentication switch 400 and the service provider 150 (1319).

The service provider 150 uses the received information on the successful authentication to search the authentication database. When the received authentication information is registered in the authentication database, the service provider 150 notifies the authentication switch 400 of the information on the successfully-authenticated terminal 600 acquired from the authentication database (1320). The authentication registration notification addressed to the authentication switch 400 includes the information on the successful authentication and the access control information (for example, information on the VLAN to which the authenticated terminal 600 is to belong). The authentication switch 400 performs the authorization processing for the MAC address of the authenticated terminal 600, and registers the authentication result in the authenticated terminal registration table 404. After the registration in the authenticated terminal registration table 404, the authenticated terminal 600 belongs to the VLAN designated by the service provider 150.

Further, the service provider 150 creates the HTTP response including the successful authentication screen for transmitting a notification that the authentication is successful to the terminal 600. Then, the service provider 150 encapsulates the created HTTP response, and transmits the encapsulated HTTP response through the tunnel set between the service provider 150 and the authentication switch 400 (1321).

When receiving the encapsulated HTTP response, the authentication switch 400 decapsulates the received HTTP response by removing the encapsulating header therefrom (1322), and transmits the decapsulated HTTP response to the terminal 600 of the transmission source of the HTTP request (1323).

When receiving the notification that the authentication is successful, the terminal 600 displays the successful authentication screen.

As described above, in addition to the above-mentioned effects of the first embodiment, according to the third embodiment, the authentication result obtained by the service provider 150 can be registered in the authenticated terminal registration table 404 even in the Shibboleth authentication system. In addition, the authentication switch 400 can manage the registered terminal 600 as the terminal that has been subjected to the network authentication.

Fourth Embodiment

Next, a fourth embodiment of this invention is described. In the fourth embodiment, the authentication server 100 retains authentication request information using a RADIUS protocol received from the authentication switch 400, and uses a result of performing the authentication between the terminal 600 and the authentication server 100 to transmit a response to the retained authentication request information to the authentication switch 400. Therefore, the authentication server 100 according to the fourth embodiment has a configuration different from the authentication server 100 according to the first embodiment illustrated in FIG. 1. It should be noted that only components, functions, and processing different from those of the first embodiment described above are described in the fourth embodiment, and the descriptions of same parts are omitted.

Figure 13:
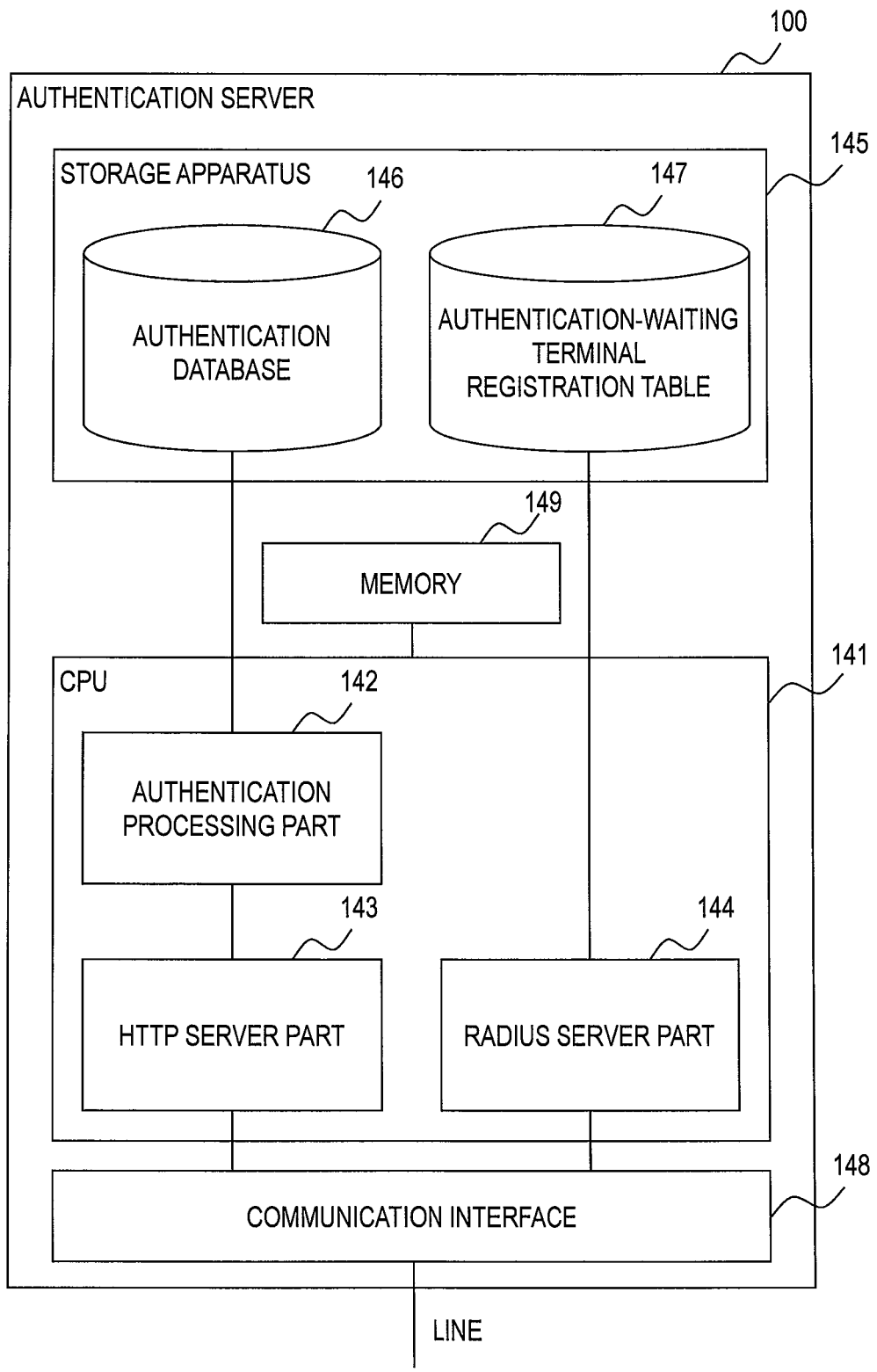
FIG. 13 is a block diagram illustrating a configuration of the authentication server according to a fourth embodiment.

FIG. 13 is a block diagram illustrating a configuration of the authentication server 100 according to the fourth embodiment.

The authentication server 100 according to the fourth embodiment is a computer including a processor (CPU) 141 for executing a program, a memory 149 for storing the program executed by the processor, a storage apparatus 145 for storing data used when the program is a executed, and a communication interface 148 coupled to the network.

The processor 141 executes the program stored in the memory. The processor 141 executes a predetermined program, to thereby implement each of the functions of an authentication processing part 142, an HTTP server part 143, and a RADIUS server part 144.

The authentication processing part 142 refers to an authentication database 146 to authenticate the authentication request transmitted from the terminal 600. The HTTP server part 143 generates an HTTP response packet for the user authentication.

The RADIUS server part 144 executes processing for generating a RADIUS response for MAC authentication. Specifically, the RADIUS server part 144 stands by until a MAC authentication request packet is received, and after the MAC authentication request packet is received, receives a RADIUS access request packet. Then, the RADIUS server part 144 extracts a pair of the IP address of the terminal 600 to be authenticated and RADIUS access request packet data from the received RADIUS access request packet, and registers the extracted information in an authentication-waiting terminal registration table 147.

The storage apparatus 145 is, for example, a non-volatile storage apparatus such as a flash memory or a magnetic storage apparatus, and stores the program executed by the processor 141 and data used when the program is executed. In other words, the program executed by the processor 141 is read out from the storage apparatus 145 and loaded into the memory to be executed by the processor 141. The storage apparatus 145 stores the authentication database 146 and the authentication-waiting terminal registration table 147.

The authentication database 146 is a database in which the information for authenticating the terminal 600 is registered. For example, in the case where the authentication uses a password, the authentication database 146 includes the user ID and the password. Further, the authentication database 146 may include an access policy (for example, information on the VLAN, the QoS, and the filter) used when the authentication is successful.

The authentication-waiting terminal registration table 147 is a table in which the information for temporarily retaining a RADIUS session when the MAC authentication is performed is registered. The authentication-waiting terminal registration table 147 retains the pair of the IP address of the terminal 600 and the RADIUS access request packet data.

The communication interface 148 is the network interface having the function of transmitting/receiving packets in conformity to, for example, the Ethernet standards.

The program executed by the processor 141 is provided to the authentication server 100 via the removable medium (such as CD-ROM or flash memory) or the network, and is stored in the storage apparatus being a non-transitory storage medium. Therefore, it is preferred that the authentication server 100 include an interface (for example, optical disc drive or USB port) for reading the removable medium.

Figure 14:
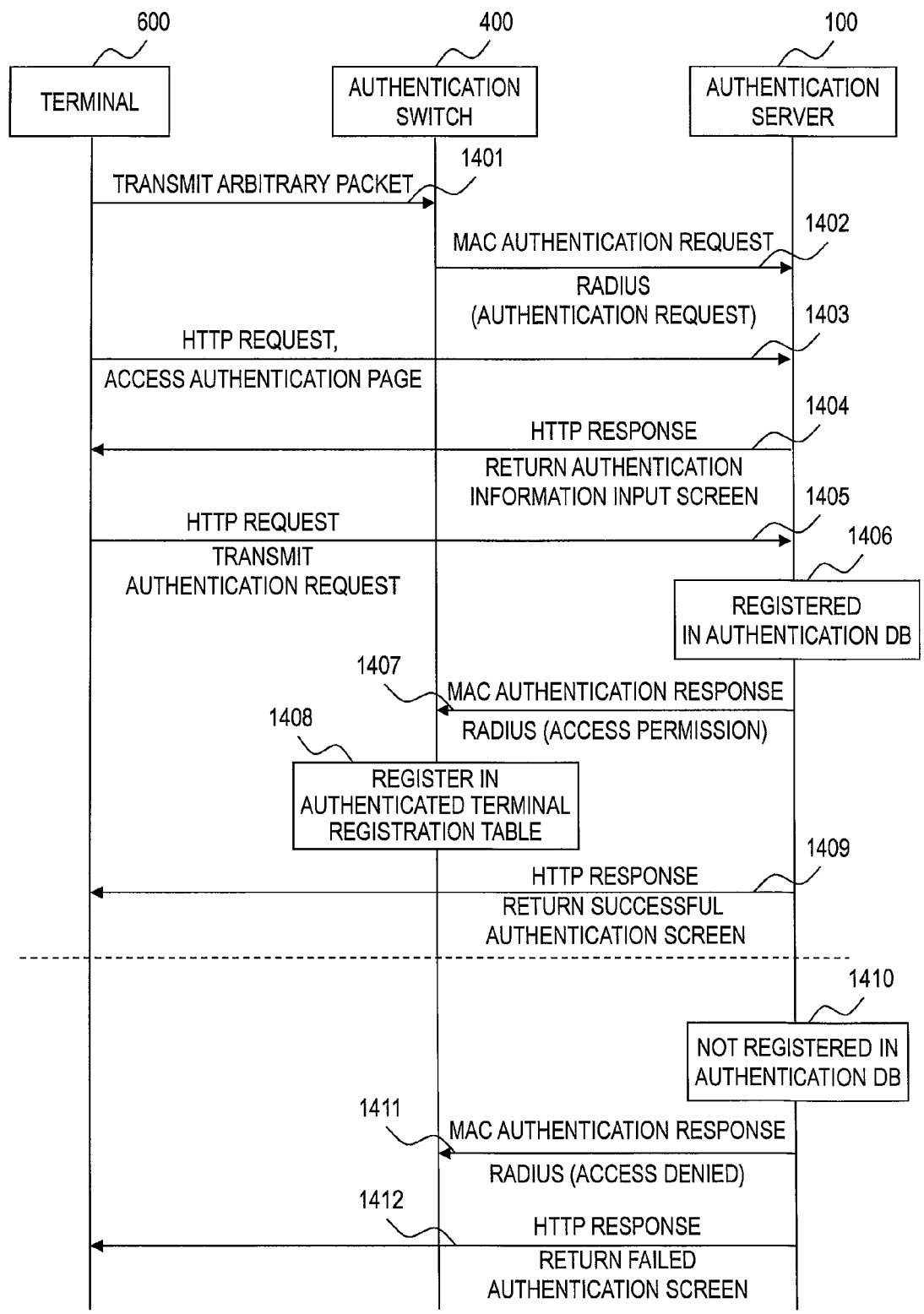
FIG. 14 is a sequence diagram according to a fourth embodiment.

FIG. 14 is a sequence diagram among the terminal 600, the authentication switch 400, and the authentication server 100 according to the fourth embodiment.

First, when being coupled to the HUB 500, the terminal 600 transmits the MAC address and the IP address given to the terminal 600 to the HUB 500. The HUB 500 transmits the MAC address and the IP address received from the terminal 600 to the authentication switch 400 (1401).

The authentication switch 400 stores the address (MAC address and IP address) of the coupled terminal 600, and causes the coupled terminal 600 to belong to the VLAN before authentication. At this time, the terminal 600 is not allowed to access the network farther than the authentication switch 400 except for the destination (in this embodiment, authentication server 100) permitted by the VLAN before authentication.

Then, the authentication switch 400 transmits the MAC authentication request packet to the authentication server (1402). The MAC authentication request packet includes the MAC address and the IP address of the terminal as a parameter of a RADIUS authentication request. Further, in order to avoid a timeout during the authentication before a MAC authentication response is transmitted in 1407, a timeout period for the RADIUS authentication is set to have a sufficiently large value.

After that, the terminal 600 transmits the HTTP request to the authentication server 100, and accesses the authentication page on the authentication server 100 (1403). At this time, the terminal 600 can access the authentication server 100 by using the VLAN before authentication. The authentication server 100 transmits the HTTP response including the data on the authentication information input screen to the terminal 600 that has accessed the authentication page (1404).

The user inputs the authentication information (for example, user ID and password) to the authentication information input screen displayed on the terminal 600. The terminal 600 transmits the input authentication information to the authentication server 100 via the authentication switch 400 (1405).

The authentication server 100 uses the received authentication information to search the authentication database 105. When the received authentication information is registered in the authentication database 105 (1406), the authentication server 100 transmits the MAC authentication response to the authentication switch 400, and notifies the authentication switch 400 of the access permission based on the RADIUS authentication (1407). The MAC authentication response addressed to the authentication switch 400 includes the information on the successful authentication and the access control information (for example, information on the VLAN to which the authenticated terminal 600 is to belong). The authentication switch 400 performs the authorization processing for the MAC address of the authenticated terminal 600, and registers the authentication result in the authenticated terminal registration table 404 (1408). After the registration in the authenticated terminal registration table 404, the authenticated terminal 600 belongs to the VLAN designated by the authentication server 100.

Further, the authentication server 100 notifies the terminal 600 that the authentication is successful (1409). When receiving the notification that the authentication is successful, the terminal 600 displays the successful authentication screen.

On the other hand, when the received authentication information is not registered in the authentication database 105 (1410), the authentication server 100 transmits the MAC authentication response to the authentication switch 400, and notifies the authentication switch 400 of the access denied based on the RADIUS authentication (1411). The authentication switch 400 does not necessarily register the information on the failed authentication in the authenticated terminal registration table 404. Further, the authentication server 100 notifies the terminal 600 that the authentication has failed (1412). When receiving the notification that the authentication has failed, the terminal 600 displays the failed authentication screen.

Figure 15:
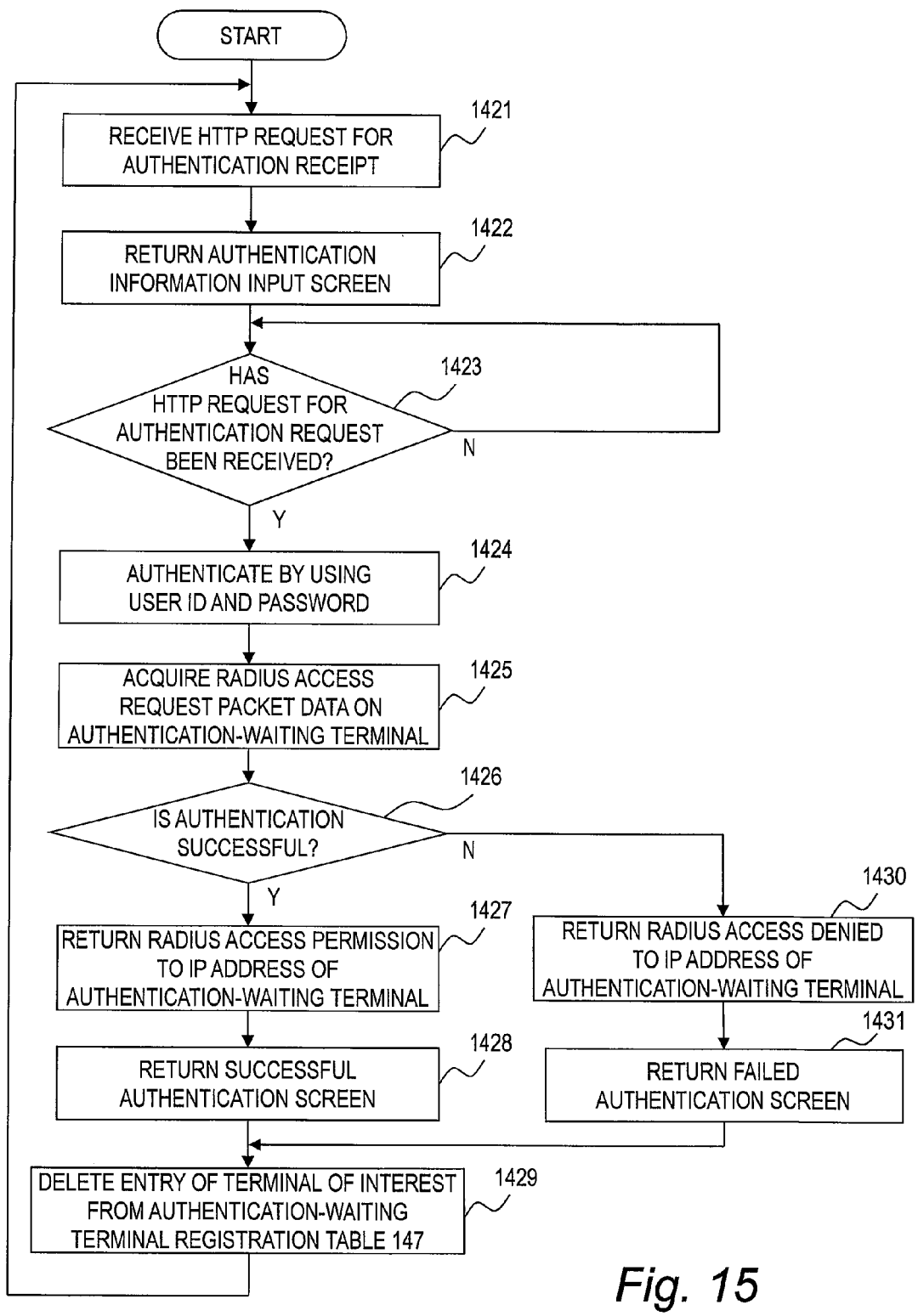
FIG. 15 is a flowchart of the authentication processing according to the fourth embodiment.

FIG. 15 is a flowchart of the authentication processing according to the fourth embodiment. The authentication processing illustrated in FIG. 15 is executed by the processor of the authentication server 100.

First, the HTTP server part 143 stands by until the HTTP request for authentication receipt is received (1421). The HTTP server part 143 transmits the authentication information input screen to the terminal 600 in response to the received HTTP request for authentication receipt (1422).

After that, the authentication processing part 142 stands by until the HTTP request for the authentication request transmitted from the terminal 600 is received (1423). When receiving the authentication request, the authentication processing part 142 refers to the authentication database 146 to perform the user authentication. When the user ID and the password included in the received authentication request are the same as the user ID and the password registered in the authentication database 146, the HTTP server part 143 determines that the authentication is successful (1424).

After that, the RADIUS server part 144 uses the IP address of the terminal 600 that has transmitted the authentication request to search the authentication-waiting terminal registration table 147, and acquires the RADIUS access request packet data corresponding to the IP address from the authentication-waiting terminal registration table 147 (1425).

When the authentication performed in Step 1424 is successful (Y in 1426), the RADIUS server part 144 returns RADIUS access permission corresponding to the acquired RADIUS access request packet data (1427). After that, the HTTP server part 143 transmits the HTTP response including the successful authentication screen to the terminal 600 (1428). In addition, the RADIUS server part 144 deletes the entry of the authenticated terminal 600 from the authentication-waiting terminal registration table 147 (1429).

On the other hand, when the authentication performed in Step 1424 has failed (N in 1426), the RADIUS server part 144 returns RADIUS access denied corresponding to the acquired RADIUS access request packet data (1430). After that, the HTTP server part 143 transmits the HTTP response including the failed authentication screen to the terminal 600 (1431). In addition, the RADIUS server part 144 deletes the entry of the terminal 600 whose authentication has failed from the authentication-waiting terminal registration table 147 (1429).

After that, the procedure returns to Step 1421, and the HTTP server part 143 stands by until the HTTP request for authentication receipt is received.

As described above, according to the fourth embodiment, the authentication result obtained by the authentication server 100 can be registered in the authenticated terminal registration table 404 even in the RADIUS authentication system for performing the MAC authentication. In addition, the authentication switch 400 can manage the registered terminal 600 as the terminal that has been subjected to the network authentication.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card. The drawings shows control lines and information lines as considered necessary for explanation but do not show all control lines or information lines in the products. It can be considered that almost of all components are actually interconnected.

What is claimed is:

1. An authentication method for realizing a network authentication function for an authentication system,
the authentication system including an authentication server for authenticating a terminal, and a switch for mediating an authentication sequence between the terminal and the authentication server,
the authentication method including steps of:
providing, by the switch, identification information for identifying the switch to the authentication server in the authentication sequence;
determining, by the switch, whether the terminal is authenticated;
transmitting, by the switch, a redirection notification including the identification information on the switch to the terminal in response to an unauthenticated access from the terminal;
authenticating, by the authentication server, an authentication request received from the terminal based on the provided identification information on the switch, the authentication server authenticating the authentication request from the terminal by using any one of authentication sequences for RADIUS authentication and Shibboleth authentication;
transmitting, by the authentication server, an authentication result of the authentication to the switch; and
authenticating, by the switch, packets from the terminal based on the authentication result received from the authentication server;
transmitting, by the switch, information on the unauthenticated access from the terminal to the authentication server after including therein the identification information on the switch.

2. The authentication method according to claim 1, further including steps of:
transmitting, by the terminal, a request to the authentication server which includes the identification information on the switch.

3. The authentication method according to claim 1, further including a step of:
transmitting, by the switch, the authentication request including identification information for identifying the terminal and the identification information on the switch to the authentication server.

4. The authentication method according to claim 1, further including a step of:
separately transmitting, by the authentication server, a notification of the authentication result to the switch and a notification of the authentication result to the terminal.

5. A transfer apparatus to mediate an authentication sequence between a terminal and an authentication server for authenticating the terminal via a network, comprising:
a communication interface coupled to the network;
a data transfer control part coupled to the communication interface; and
a processor coupled to the data transfer control part,
the processor being configured to:
provide identification information for identifying the transfer apparatus to which the terminal is coupled via the communication interface to the authentication server in the authentication sequence;
determine whether the terminal is authenticated by the authentication server, the authentication server authenticating the terminal by using any one of authentication sequences for RADIUS authentication and Shibboleth authentication;
transmit a redirection notification including the identification information on the transfer apparatus to the terminal via the communication interface in response to an unauthenticated access from the terminal;
receive an authentication result of authenticating the terminal, from the authentication server based on the provided identification information on the transfer apparatus, via the communication interface; and
authenticate packets from the terminal based on the authentication result received from the authentication server via the communication interface,
wherein the transfer apparatus transmits information on the unauthenticated access from the terminal to the authentication server after including therein the identification information on the transfer apparatus.

6. The transfer apparatus according to claim 5, wherein the processor is further configured to:
receive a request to the authentication server, which includes the identification information on the transfer apparatus, from the terminal via the communication interface.

7. The transfer apparatus according to claim 5, wherein the transfer apparatus transmits an authentication request including identification information for identifying the terminal and the identification information on the transfer apparatus to the authentication server.

8. An authentication system including a server for authenticating a terminal coupled to a switch for mediating an authentication sequence between the terminal and the authentication server, comprising:
a processor for executing a program;
a memory for storing the program; and
an interface coupled to a network,
the authentication server being configured to:
receive identification information for identifying the switch in the authentication sequence;
authenticate an authentication request received from the terminal based on the received identification information on the switch, the authentication server authenticating the authentication request from the terminal by using any one of authentication sequences for RADIUS authentication and Shibboleth authentication;

transmit a redirection notification including the identification information on the switch to the terminal in response to an unauthenticated access from the terminal;

transmit an authentication result of the authentication to the switch, and wherein the authentication result is transmitted to the switch and used to authenticate packets sent from the terminal and received by the switch, wherein the identification information on the switch is received by the terminal after the switch determines that the terminal is unauthenticated, and wherein the authentication server is further configured to receive information on the unauthenticated access from the terminal including the identification information on the switch.

9. The authentication system according to claim 8, wherein the authentication server is further configured to receive the authentication request including identification information for identifying the terminal and the identification information on the switch from the switch.

10. The authentication system according to claim 8, wherein the authentication server is further configured to transmit a notification of the authentication result to the switch and a notification of the authentication result to the terminal.

* * * * *